United States Patent [19]
Kawano

[11] Patent Number: 5,995,166
[45] Date of Patent: Nov. 30, 1999

[54] CLAMP CIRCUIT FOR CLAMPING A VIDEO SIGNAL AND A CIRCUIT FOR SUPERIMPOSING COMPOSITE VIDEO SIGNALS

[75] Inventor: Tsutomu Kawano, Tokyo, Japan

[73] Assignee: Mitsubishi Denki Kabushiki Kaisha, Tokyo, Japan

[21] Appl. No.: 08/864,449

[22] Filed: May 28, 1997

[30] Foreign Application Priority Data

Dec. 25, 1996 [JP] Japan .................................. 8-345319

[51] Int. Cl.$^6$ .............................. H04N 5/16; H04N 5/18
[52] U.S. Cl. ........................ 348/691; 348/689; 348/695
[58] Field of Search .................................. 348/691, 689, 348/695, 584, 585, 586, 589, 590, 591; H04N 5/16, 5/18

[56] References Cited

U.S. PATENT DOCUMENTS

| 3,813,488 | 5/1974 | Cavett et al. . | |
| 4,580,068 | 4/1986 | Filliman | 348/695 |
| 5,280,356 | 1/1994 | Hiyamatsu et al. | 348/691 |

FOREIGN PATENT DOCUMENTS

| 443770 | 2/1992 | Japan . |
| 4137977 | 5/1992 | Japan . |
| 8191403 | 7/1996 | Japan . |

*Primary Examiner*—Nathan Flynn
*Assistant Examiner*—Vivek Srivastava
*Attorney, Agent, or Firm*—Leydig, Voit & Mayer, Ltd.

[57] ABSTRACT

The present invention provides a clamp circuit for clamping a video signal which includes a sync tip clamp circuit, a pedestal clamp circuit, and a direct current electrical potential correcting circuit. The sync tip clamp circuit clamps a sync tip of the horizontal synchronization signal of the composite video signal at a first reference electrical potential when a clamp pulse is not received in a pulse input terminal, and outputs the composite video signal to an output terminal. The pedestal clamp circuit clamps the pedestal DC electrical potential of the composite video signal received to the video signal input terminal to the second reference electric potential when the clamp pulse is received at the pulse input terminal, and outputs the composite video signal to the output terminal. The direct current electrical potential correcting circuit adjusts DC power levels of the composite video signals in response to the output signal of the first reference electrical potential from the sync tip clamp circuit and the output signal of the second reference electrical potential from the pedestal clamp circuit. According to the present invention, the composite video signal is not largely changed even if the clamp pulses drop out.

12 Claims, 11 Drawing Sheets

FIG. 9A (PRIOR ART) VIDEO SIGNAL

FIG. 9B (PRIOR ART) CLAMP PULSE

CLAMP CIRCUIT FOR CLAMPING A VIDEO SIGNAL AND A CIRCUIT FOR SUPERIMPOSING COMPOSITE VIDEO SIGNALS

BACKGROUND OF THE INVENTION

1. Field of the Invention

The invention relates to, for example, a clamp circuit used for a television signal superimposing circuit to superimpose a television signal (composite video signal) and a signal (composite video signal) from a microcomputer. In particular, it relates to a clamp circuit which is available when a part of a clamp pulse for the composite video signal drops out. Furthermore, if explaining in detail, the invention relates to a clamp circuit which operates with the same function as that of a pedestal clamp circuit when the clamp pulse is inputted and operates with the same function as that of a sync tip clamp circuit when the clamp pulse is not inputted (including the case when the pulse drops out).

2. Description of the Prior Art

In processing a composite video signal, since mean electrical potential changes by the information of a composite video signal, in particular, an intensity signal (contrast), clamp processing is performed to make direct current electrical potential constant by using the clamp circuit. Generally there are two categories in this clamp processing. One of them is a sync tip clamp processing which keeps the sync tip (leading edge of a sink portion) level to a constant direct current electrical potential (sync tip direct current "DC" electrical potential). The other is a pedestal clamp processing which keeps a pedestal level of the composite video signal to a constant direct current electrical potential (pedestal direct current "DC" electrical potential).

First, before explaining these two categories of the clamp processing, the sync tip DC electrical potential and the pedestal DC electrical potential will be explained using FIG. 9A and FIG. 9B. FIG. 9A and FIG. 9B show timing relationship of a composite video signal and a clamp pulse. FIG. 9A shows the composite video signal which includes at least a horizontal synchronizing pulse period, a pedestal period (including a color burst), and a video signal period (which is the portion shown by zig-zag line) per one horizontal period.

Minimum electrical potential of the composite video signal is, as shown by mark A, a portion which is a part of horizontal synchronizing pulse, or a portion called a sink. The direct current electrical potential of the sync tip level is called a sync tip DC electrical potential. On the other hand, a central direct current level shown by mark B is a pedestal level whose direct current electrical potential is called a pedestal DC electrical potential. FIG. 9B shows a clamp pulse. The clamp pulse generated at the portion for clamping the composite video signal is generally used to detect the pedestal DC electrical potential.

The sync tip clamp processing is explained below. The processing is generally used in such a circuit as to keep the leading edge of the sink constant by using a peak hold circuit. For example, it may be constructed by the circuit shown in FIG. 10. In FIG. 10, the circuit comprises an NPN transistor (Tr1) 27, a direct current (DC) bias source 28, whose electrical potential is Vsync, a hold capacitor (C1) 29 and a discharge resistor (R1) 30.

The sync tip clamp circuit constructed as described above operates as follows. When the sync tip DC electrical potential of the composite video signal inputted into the input terminal is lower than Vsync (a direct current electrical potential from the DC bias source 28)−Vbe (which is the voltage between base-emitter of the transistor 27, approximately 0.7 V), the transistor 27 is conductive state, therefore it rapidly charges the hold capacitor 29. During the period of the sync tip in the composite video signal, or horizontal synchronizing pulse period, the sync tip DC electrical potential of the composite video signal in an output terminal becomes [Vsync−Vbe] and the charge continues until the transistor 27 becomes non-conductive state. Accordingly, the sync tip DC electrical potential becomes [Vsync−Vbc], and the composite video signal based on the electrical potential is outputted from the output terminal.

On the other hand, since the transistor 27 is non-conductive state when the sync tip DC electrical potential of the composite video signal inputted into an input terminal is higher than [Vsync−Vbe], the charge of the capacitor 29 is discharged until the sync tip DC electrical potential becomes [Vsync−Vbe] by the resistor 30. Accordingly, the sync tip DC electrical potential becomes [Vsync−Vbe], and the composite video signal based on the electrical potential is outputted from the output terminal. As described above, the sync tip DC electrical potential is converged to a constant electrical potential [Vsync−Vbe] and the composite video signal based on the constant electrical potential [Vsync−Vbe] is outputted from the output terminal. A circuit using diodes may be used instead of the transistor 27.

Next, the pedestal clamp processing is explained below. In the processing, the circuit receives a clamp pulse during the pedestal period of a composite video signal to monitor the direct current electrical potential of the composite video signal during the pulse period of the clamp pulse, and keeps the monitored electrical potential constant. For example, the prior pedestal processing circuit is shown in FIG. 11.

In FIG. 11, the pedestal processing circuit comprises a current mirror circuit 31 constructed by a pair of PNP transistors, a differential pair transistor 32 constructed by a pair of NPN transistors, a reference voltage resource 33 for generating a reference electrical potential Vped of the clamp, and a constant electric current source 34. The above mentioned current mirror circuit 31, the differential pair transistor 32, and the constant electric current source 34 constitute a comparator. The pedestal processing circuit further comprises a differential pair transistor 35 constructed by a pair of PNP transistors, a constant current source 36, and a current mirror 37 constructed by a pair of NPN transistors. The above mentioned differential pair transistor 35, the constant current source 36 and the current mirror 37 constitute a differential amplification circuit. The pedestal processing circuit further comprises a DC bias source 38, a resistor 39, a sample hold capacitor 40, and an emitter follower transistor 41 constructed by an NPN transistor.

The comparator which is constructed by the current mirror circuit 31, the differential pair transistor 32, and the constant current source 34 detects the potential difference of the pedestal DC electrical potential of the composite video signal inputted into an input and the reference electrical potential Vped of the reference voltage source 33. The comparator includes a switch 16, which activates/deactivates the operation of the comparator by ON/OFF operation thereof. In other words, only when a clamp pulse inputted into the switch 16 is of high level (pulse period), the switch 16 turns ON and the comparator becomes active state.

When the switch 16 is ON in response to the clamp pulse, the comparator compares the pedestal DC electrical potential of the composite video signal inputted with the reference electrical potential Vped of the reference voltage source 33, charges/discharges the capacitor 40 based on the result obtained by comparison, and holds the electrical potential of the capacitor 40 to an electrical potential based on the reference electrical potential Vped. On the other hand, when the switch 16 is OFF without receiving a clamp pulse, the comparator is in non-active state. In other words, since the comparator does not operate, the electrical potential of the capacitor 40 is held as it is.

Also, the differential amplification circuit constructed by the differential pair transistor 35, the constant current source 36 and the current mirror 37 controls the electric current flowing into the resistor 39 by the electrical potential charged in the capacitor 40, which controls the direct current electrical potential appearing at the output terminal. Now, if the pedestal DC electrical potential of the composite video signal inputted through the input terminal and the emitter follower transistor 41 is higher than the reference electrical potential Vped, the capacitor 40 discharges, and the electrical potential of the capacitor 40 falls. Therefore, the electrical potential of the capacitor 40 becomes lower than the reference electrical potential of the DC bias source 38, so the current mirror 37 of the differential amplification circuit pulls the current through the resistor 39. As a result, the pedestal DC electrical potential of the output terminal falls.

On the other hand, if the pedestal DC electrical potential of the composite video signal inputted through the input terminal and the emitter follower transistor 41 is lower than the reference electrical potential Vped, the capacitor 40 is charged, and the current mirror 37 of the differential amplification circuit supplies the electrical current through the resistor 39, so that the pedestal DC electrical potential of the output terminal rises. As a result of feedback operation like this, the pedestal DC electrical potential of the composite video signal in the output terminal coincides with the reference electrical potential Vped, so that the composite video signal based on the reference electrical potential Vped is outputted from the output terminal.

Accordingly, in sync tip clamp processing, a clamp pulses is not required, which can simplify the system for processing a composite video signal. But, if the composite video signal is the one which has been transmitted like a television signal, shrinkage and elongation of the sink occur according to good or bad transfer condition and various kinds of the signal processing circuits. In other words, the potential difference between the sync tip DC electrical potential and the pedestal DC electrical potential of the composite video signal inputted may become small or large, which may change the pedestal DC electrical potential. As a result, the position such as the pedestal representing the bright and dark may shift from the original position.

On the other hand, in a pedestal clamp processing, since the pedestal DC electrical potential is clamped, failure will not occur at the position of the pedestal as long as a clamp pulse is outputted precisely. But, since a clamp pulse is needed necessarily in a pedestal clamp processing, accuracy decreases when dropping of a clamp pulse occurs. The pedestal clamp processing can not be applied to the system having the mode of processing a composite video signal without the clamp pulse.

SUMMARY OF THE INVENTION

It is an object of the present invention to provide a clamp circuit in which pedestal clamp processing is conducted in order to perform clamp processing with high accuracy when the clamp pulse is outputted precisely, and sync tip clamp processing is conducted to compensate for the weak point of pedestal clamp processing when the clamp pulse drops out.

It is another object of the present invention to provide a clamp circuit for carrying out clamp processing precisely in a system having the mode of processing the composite video signal with a clamp pulse outputted and the mode of processing the composite video signal with no clamp pulse outputted.

It is a further object of the present invention to provide a clamp circuit which is suitable for a semiconductor integrated circuit device, and which is able to conduct pedestal clamp processing and sync tip clamp processing by using one sample hold capacitor.

According to one aspect of the invention, a clamp circuit for clamping a video signal comprises a video signal input terminal for receiving a composite video signal including a horizontal synchronization signal, a pedestal signal and a video signal; a clamp pulse input terminal for receiving a clamp pulse; an output terminal for outputting a composite video signal.

The clamp circuit further comprises a direct current electrical potential correction circuit for receiving the composite video signal from the video signal input terminal and a correction control signal, correcting a direct current electrical potential of the composite video signal in response to the correction control signal, and outputting the corrected composite video signal from the output terminal.

The clamp circuit further comprises a first processing circuit which receives the composite video signal from the direct current electrical potential correction circuit and a first reference electrical potential from a first reference voltage source, and outputs said correction control signal to the direct current electrical potential correction circuit for carrying out a sync tip clamp processing.

The clamp circuit further comprises a second processing circuit which receives the composite video signal from the direct current electrical potential correction circuit, a second reference electrical potential from a second reference voltage source, and a clamp pulse from the clamp pulse input terminal, and output the correction control signal to the direct current electrical potential correction circuit, for carrying out a pedestal clamp processing According to another aspect of the invention, a clamp circuit for processing a video signal comprises a direct current electrical potential correction circuit for receiving the composite video signal from the video signal input terminal and a correction control signal, correcting a direct current electrical potential of the composite video signal in response to the correction control signal, and outputting the corrected composite video signal from the output terminal.

The clamp circuit further comprises a clamp pulse presence discrimination circuit for detecting presence or absence of the clamp pulse to output a clamp pulse presence or absence signal.

The clamp circuit further comprises a first processing circuit which receives the composite video signal from the direct current electrical potential correction circuit, a first reference electrical potential from the first reference voltage source, and the clamp pulse presence or absence signal from the clamp pulse presence discrimination circuit, activates the first processing circuit when the received clamp pulse presence or absence signal indicates an absence, detects the lowest electrical potential of the composite video signal outputted from the direct current electrical potential correction circuit, clamps the detected electrical potential to the first reference electrical potential, and outputs the clamped electrical potential to the direct electrical potential correction circuit as the correction control signal, for carrying out a sync tip clamp processing.

The clamp circuit further comprises a second processing circuit which receives the composite video signal from the direct current electrical potential correction circuit, a second reference electrical potential from a second reference voltage source, and a clamp pulse from the clamp pulse input terminal, detects an electrical potential of the inputted composite video signal during the pulse period corresponding to the clamp pulse, clamps the detected electrical potential to the second reference electrical potential, and outputs the clamped electrical potential to the direct electrical potential correction circuit as the correction control signal, for carrying out a pedestal clamp processing.

According to further aspect of the invention, a composite video signal superimposing circuit comprises a first clamp circuit which receives a main composite video signal, a first reference electrical potential and a second reference electrical potential, outputs the main composite video signal based on the first reference electrical potential when the clamp pulse is not received, and outputs the main composite video signal based on the second reference electrical potential when a clamp pulse is received.

The composite video signal superimposing circuit further comprises a second clamp circuit which receives a sub-composite video signal and a second reference electrical potential, outputs the sub-composite video signal based on the second reference electrical potential when the clamp pulse is received.

The composite video signal superimposing circuit further comprises a switching circuit which receives the main and the sub-composite video signal from the first and second clamp circuits, and selectively outputs the main composite video signal or the sub-composite video signal in response to an switching signal.

DETAILED DESCRIPTION OF THE PREFERRED EMBODIMENTS

Embodiment 1

Figure 1:
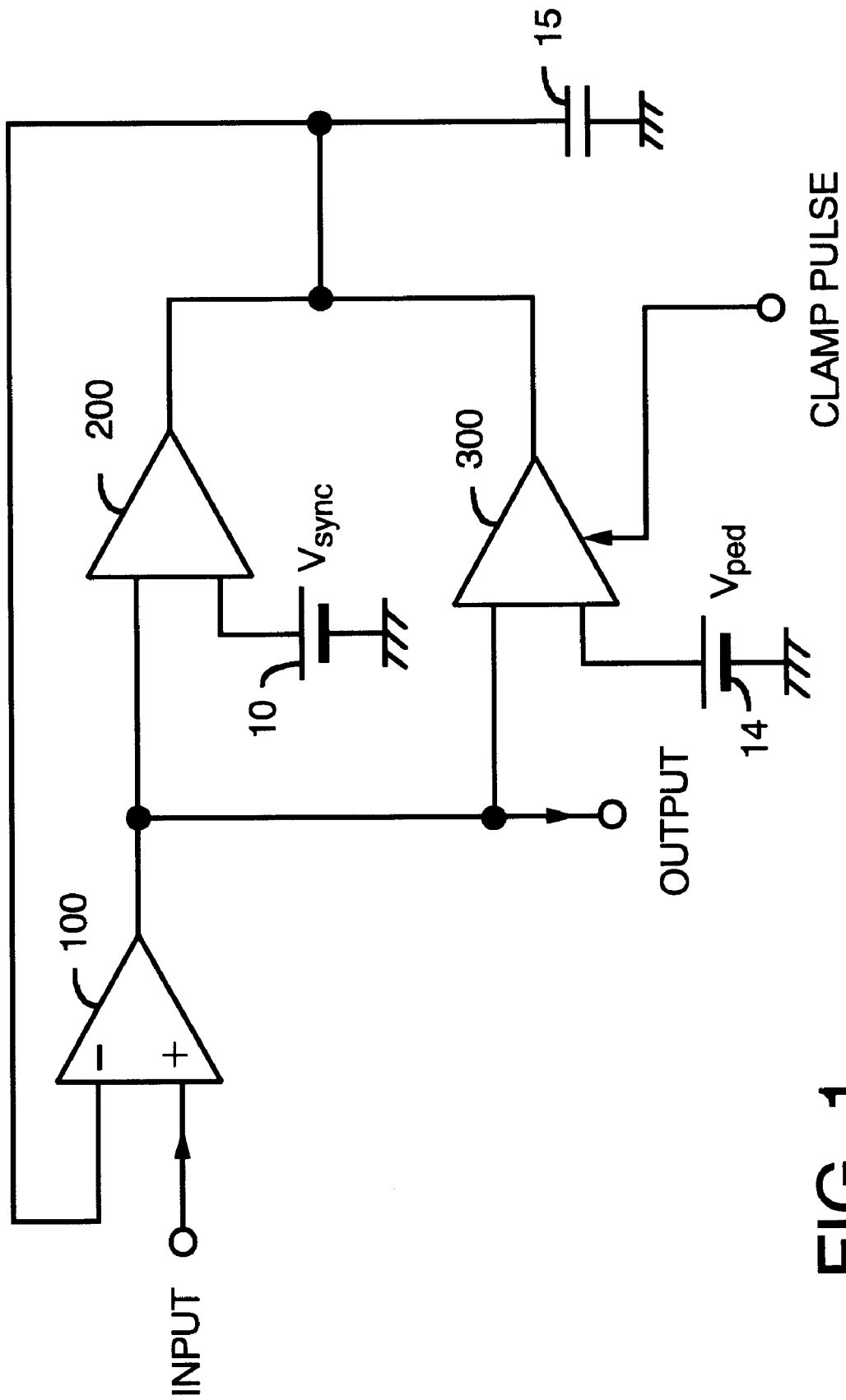
FIG. 1 shows an example of a clamp circuit of a first embodiment of the present invention.

FIG. 1 shows a clamp circuit of a first embodiment of the present invention. In FIG. 1, a direct current electrical potential correcting circuit 100 has a non-inverted input node which is connected to the input terminal into which a composite video signal is inputted, an inverted input terminal which is connected to the point of a sample hold electrical potential, and an output node which is connected to an output terminal. The direct current electrical potential correcting circuit 100 clamps the direct current electrical potential of the composite video signal inputted to the non-inverted input node based on the direct current electrical potential at the point of the sample hold electrical potential inputted to the inverted input node to output to the output node the composite video signal whose direct current electrical potential is clamped. For example, the circuit 100 is constructed by a differential amplification circuit.

A first processing circuit 200 has a first input node, a second input node and an output node. The first input node is connected to the output node of the direct current electrical potential correcting circuit 100, the second input node is connected to a first reference voltage source 10, and the output node is connected to the point of a sample hold electrical potential. The first processing circuit compares the output from the direct current electrical potential correcting circuit 100 inputted into the first input node with the first reference electrical potential (a sync tip clamp reference electrical potential) Vsync from the first reference voltage source 10 inputted into the second input node. The first processing circuit 200 outputs the electrical potential obtained by comparison is to the point of the above described sample hold electrical potential to conduct a sync tip clamp processing. The first processing circuit 200 is, for example, constructed by a comparator. Furthermore, the first reference voltage source 10 is constructed by a constant voltage generating circuit which is generally known and the first reference electrical potential Vsync from the first reference voltage source 10 is set based on the sync tip DC electrical potential in the composite video signal.

A second processing circuit 300 has a first input node, a second input node, an output node, and a control node. The first input node is connected to an output node of the direct current electrical potential correcting circuit 100, the second input node is connected to the second reference voltage source 14, the output node is connected to the point of the sample hold electrical potential, and the control node is connected to a clamp pulse input terminal into which a clamp pulse is inputted. The second processing circuit is activated by receiving a clamp pulse inputted into the clamp pulse input node. The second processing circuit compares the output from the direct current electrical potential correcting circuit 100 inputted into the first input node with a second reference electrical potential (a pedestal clamp reference electrical potential) Vped from the second reference voltage source 14 inputted into the second input node, and outputs the electrical potential obtained by the comparison to the point of the sample hold electrical potential in order to conduct pedestal clamp processing. The second processing circuit is, for example, constructed by the comparator whose active/non-active state is controlled by the clamp pulse. Further, the second reference voltage source 14 is constructed by the constant voltage generating circuit which is generally known and the first reference electrical potential Vped of the second reference voltage source 14 is set based on a pedestal DC electrical potential in a composite video signal.

In addition, the direct current electrical potential correcting circuit 100, the first and the second processing circuits 200, 300 are defined on one semiconductor integrated circuit device. Furthermore, the first and the second reference voltage sources 10, 14 may be also defined on the semiconductor integrated circuit. One electrode of the sample hold capacitor 15 is connected to the point of a sample hold electrical potential, and the other electrode is connected to the point of a ground electrical potential. The capacitor is arranged separately from the semiconductor integrated circuit which is provided with the direct current electrical potential correcting circuit 100, the first and second processing circuits 200, 300, as an exterior type device.

Next, the operation of the clamp circuit is explained below. The direct current electrical potential correcting circuit 100 receives the composite video signal from the input terminal, and clamps the direct current electrical potential based on the direct current electrical potential of the point of a sample hold electrical potential inputted into an inverted input node, then outputs the composite video signal in which the direct current electrical potential is clamped to the output node to wholly adjust DC level of the composite video signal. The output signal of the direct current electrical potential correcting circuit 100 is inputted into the first processing circuit 200 and the second processing circuit 300, respectively, and also to the output terminal.

The composite video signal which is the output signal of the direct current electrical potential correcting circuit 100 inputted into the first processing circuit 200 is compared with the first electrical potential Vsync of the first reference voltage source 10 by the first processing circuit 200. As a result, the first processing circuit 200 operates to control the DC voltage of the sample hold capacitor 15 at the point of the sample hold electric potential to make the sync tip DC electrical potential of the composite video signal coincident with the first reference electrical potential Vsync of the first reference voltage source 10. On the other hand, in the second processing circuit 300, when receiving the clamp pulse, the composite video signal which is the output signal of the direct current electrical potential correcting circuit 100 is compared with the second reference electrical potential Vped of the second reference voltage source 14. As a result, the second processing circuit 300 operates to control the DC voltage of the sample hold capacitor 15 of the point of the sample hold electrical potential to make the pedestal DC electrical potential of the composite video signal coincident with the second reference electrical potential Vped of the second reference voltage source 14. Furthermore, when not receiving a clamp pulse, since the second processing circuit 300 is in a non-active state, it doesn't have any influence on the point of the sample hold electrical potential.

Accordingly, in the clamp circuit constructed as described above, when a clamp pulse is inputted into the clamp pulse input terminal, the second processing circuit 300 charges or discharges the sample hold capacitor 15 so that the pedestal DC electrical potential of the composite video signal which is the output signal of the direct current electrical potential correcting circuit 100 coincident with the second reference electrical potential Vped of the second reference voltage source 14, and outputs the predetermined electrical potential to the point of sample hold electrical potential. Based on the electrical potential which appears at the point of the sample hold electrical potential, the direct current electrical potential correcting circuit 100 clamps the pedestal DC electrical potential of the input composite video signal and outputs the clamped electrical potential to the output terminal. As a result, the pedestal DC electrical potential of the composite video signal at the output terminal coincides with the second reference electrical potential Vped and the composite video signal based on the second reference electrical potential Vped is outputted from the output terminal.

On the other hand, when the clamp pulse is not inputted, since the second processing circuit 300 is in a non-active state it doesn't have any influence on the point of the sample hold electrical potential. Therefore, the first processing circuit 200 charges or discharges the sample hold capacitor 15 so that the sync tip DC electrical potential of the composite video signal which is the output signal of the direct current electrical potential correcting circuit 100 coincides with the first reference electrical potential Vsync of the first reference voltage source 10, and makes the point of the sample hold electrical potential to be the predetermined electrical potential. Based on the electrical potential which appears at the point of the sample hold electrical potential, the direct current electrical potential correcting circuit 100 clamps the sync tip DC electrical potential of the input composite video signal and outputs the clamped electrical potential to the output terminal. As a result, the sync tip DC electrical potential of the composite video signal in the output terminal coincides with the first reference electrical potential Vsync and the composite video signal based on the first reference electrical potential Vsync is outputted from the output terminal.

Figure 2:
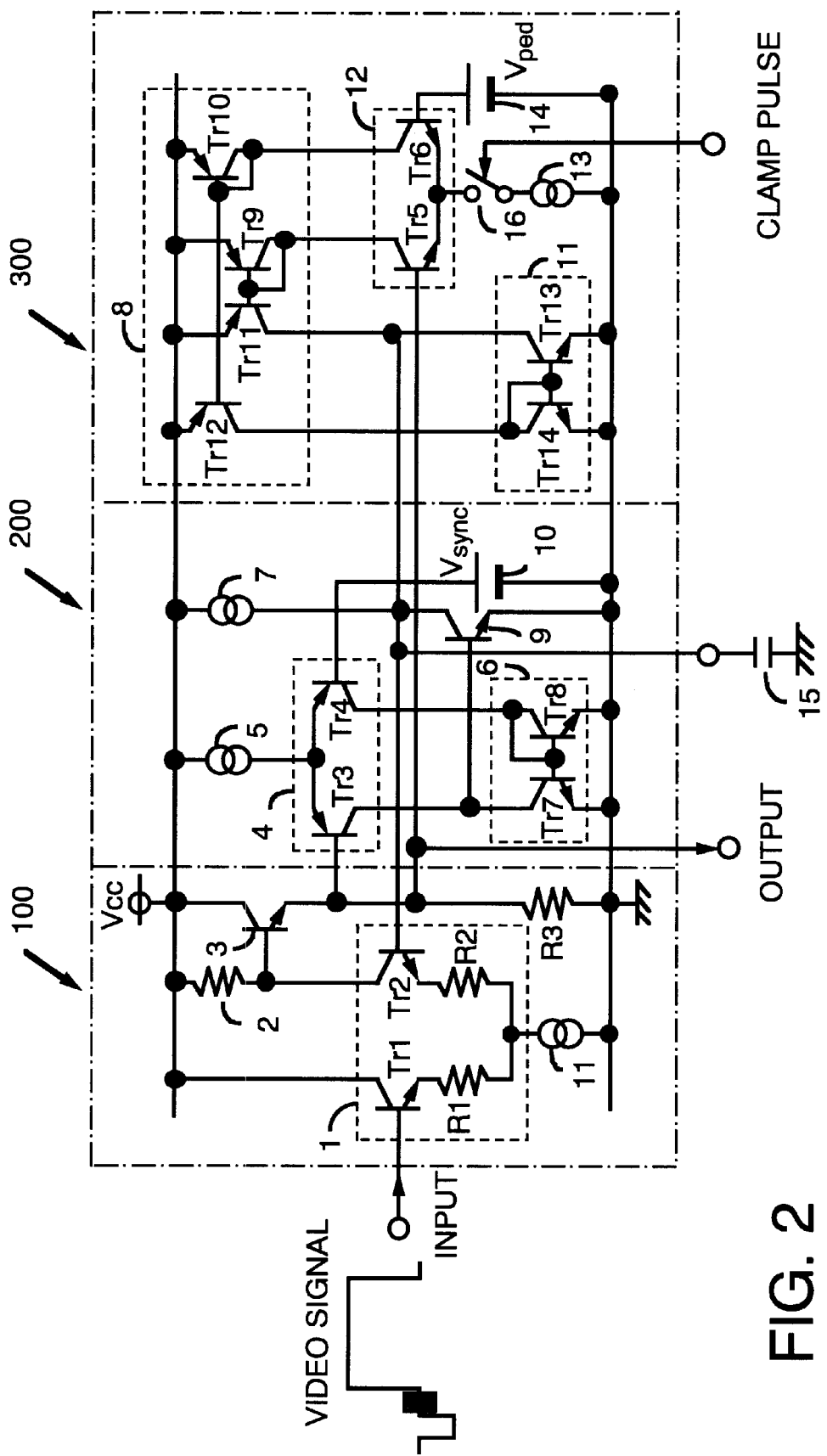
FIG. 2 shows an example of the circuit of FIG. 1.

Next, the concrete example of the direct current electrical potential correcting circuit 100, the first and second processing circuits 200, 300 in the clamp circuit shown in FIG. 1 are explained using FIG. 2. In FIG. 2, a pair of differential transistors 1 are constructed by a pair of NPN transistors Tr1, Tr2 and resistors R1, R2. The base electrode of the NPN transistor Tr1 is connected to the non-inverted input node of the direct current electrical potential correcting circuit 100, and to the input terminal into which a composite video signal is inputted. The collector electrode of the NPN transistor Tr1 is connected to the voltage source Vcc, and the emitter of the NPN transistor Tr1 electrode is connected to one end of the resistor R1. The base electrode of the NPN transistor Tr2 is connected to the inverted input node of the direct current electrical potential correcting circuit 100, to the point of the sample hold electrical potential to which one of the electrodes of the sample hold capacitor 15 is connected. The NPN transistor Tr2 has a collector electrode and an emitter electrode. The collector electrode is connected to a voltage source Vcc through a load resistance 2, the emitter electrode is connected to one end of the resistor R2. The other end of the resistor R1 and the other end of the resistor R2 are connected to the ground electrical potential node through a constant current source I1. The differential amplification circuit is constructed by the differential pair transistor 1, the load resistance 2 and the constant current source I1.

An emitter follower 3, constructed by an NPN transistor, which takes out the output from the differential amplification circuit, has a base electrode, a collector electrode, and an emitter electrode. The base electrode is connected to the collector electrode of the NPN transistor Tr2, the collector electrode is connected to the voltage source Vcc, and the emitter electrode is connected to the output node of the direct current electrical potential correcting circuit 100 and also connected to the ground electrical potential node through a resistor R3. The emitter follower 3 and the resistor R3 constitute an output buffer circuit. The output buffer circuit and the differential amplifier circuit constitute the direct current electrical potential correcting circuit 100.

A differential pair transistor 4 is constructed by a pair of PNP transistors Tr3, Tr4. The base electrode of the PNP transistor Tr3 is connected to the first input node of the first processing circuit 200, and to the output node of the direct current electrical potential correcting circuit 100. The PNP transistor Tr4 whose base electrode is connected to the second input node of the first processing circuit 200, and to the first reference voltage source 10. The emitter of PNP transistor Tr3 and the emitter electrode of PNP transistor Tr4 are connected to the voltage source Vcc through the constant current source 5.

A current mirror circuit 6 is constructed by a pair of NPN transistors Tr7, Tr8. The collector electrode of the NPN transistor Tr7 is connected to the collector electrode of the PNP transistor Tr3, whose emitter electrode is connected to a ground electrical potential node. The collector electrode of the NPN transistor Tr8 is connected to the collector electrode of the PNP transistor Tr4, the emitter electrode is connected to a ground electrical potential node, and the base electrode is connected to the collector electrode thereof and also connected to the base electrode of the NPN transistor Tr7. The differential pair transistor 4, the constant current source 5 and the current mirror circuit 6 constitute a comparator.

A saturation switch is constructed by an NPN transistor 9. The base electrode of the NPN transistor 9 is connected to the output node of the comparator, or the collector electrode of PNP transistor Tr3. The collector electrode of the NPN transistor 9 is connected to the voltage source Vcc through the constant current source 7 and is also connected to the output node of the first processing circuit 200, and to the point of the sample hold electrical potential. The emitter electrode of the NPN transistor 9 is connected to the ground electrical potential node. The output buffer circuit is constructed by the NPN transistor 9 and the constant current source 7. Also, the first processing circuit 200 is constructed by the output buffer circuit and the comparator for carrying out sync tip clamp processing.

A differential pair transistor 12 is constructed by NPN transistors Tr5, Tr6. A base electrode of the NPN transistor Tr5 is connected to the first input node of the second processing circuit 300, and to the output node of the direct current electrical potential correcting circuit 100. A base electrode of the NPN transistor Tr6 is connected to the second input nodes of the second processing circuit 300, and to the second reference voltage source 14. The emitter of the NPN transistor Tr5 and the emitter electrode of Tr6 are connected to the ground electrical potential node through the circuit of the switch 16 which is connected to the constant current source 13 in series. The switch 16 is, for example, constructed by the NPN transistor whose base electrode is connected to the clamp pulse input terminal, and ON/OFF of the switch is controlled by a clamp pulse.

A current mirror circuit 8 is constructed by 2 pairs of PNP transistors Tr9 to Tr12. The emitter electrodes of the PNP transistors Tr9 to Tr12 are connected to the voltage source Vcc. The collector electrode and the base electrode of the PNP transistor Tr9 are connected to the collector electrode of the NPN transistor Tr5. The PNP transistor Tr9 functions as a load element of the NPN transistor Tr5. The collector electrode and the base electrode of the PNP transistor Tr10 are connected to the collector electrode of the NPN transistor Tr6. A PNP transistor Tr10 functions as a load element of the NPN transistor Tr6. The base electrode of the PNP transistor Tr1 is connected to the base electrode of the PNP transistor Tr9. The PNP transistor Tr9 and the PNP transistor Tr11 constitute one current mirror circuit. The collector electrode of the PNP transistor Tr11 is connected to the output node of the second processing circuit 300, and to the point of the sample hold electrical potential. The base electrode of the PNP transistor Tr12 is connected to the base electrode of the PNP transistor Tr10. The PNP transistor Tr10 and the PNP transistor Tr12 constitute one current mirror circuit. The differential pair transistor 12, the switch 16, the constant current source 13 and the PNP transistors Tr9, Tr10 of the current mirror circuit 8 constitute a comparator whose active/non-active state is controlled by the clamp pulse.

A current mirror circuit 11 is constructed by a pair of NPN transistors Tr13, Tr14. The emitter electrodes of the NPN transistors Tr13, Tr14 are connected to the ground electrical potential node. The collector electrode of the NPN transistor Tr13 is connected to the collector electrode of the PNP transistor Tr11. The collector electrode and the base electrode of the NPN transistor Tr14 are connected to the collector electrode of the PNP transistor Tr12. The PNP transistors Tr11, Tr12 of the current mirror circuit 8 and the current mirror circuit 11 constitute an output buffer circuit. And the output buffer circuit and the comparator constitute a second processing circuit 300 for carrying out a pedestal clamp processing.

The operation of the clamp circuit constructed as described above is explained below. The composite video signal is inputted into the base electrode of the transistor Tr1 of the differential amplification circuit in the direct current electrical potential correcting circuit 100 through the input terminal and the input node. Usually, the gain of the differential amplification circuit is selected to be about "1", and in the embodiment the gain is also set to about "1". On the other hand, the output signals (which is, actually, converted into a direct current electrical potential by the sample hold capacitor) from the first and second processing circuits 100 and 200 are fed back to the base electrode of the transistor Tr2 of the differential amplification circuit, and the direct current electrical potential of the composite video signal is controlled by the feed back signal. This is explained by using FIG. 3.

Figure 3:
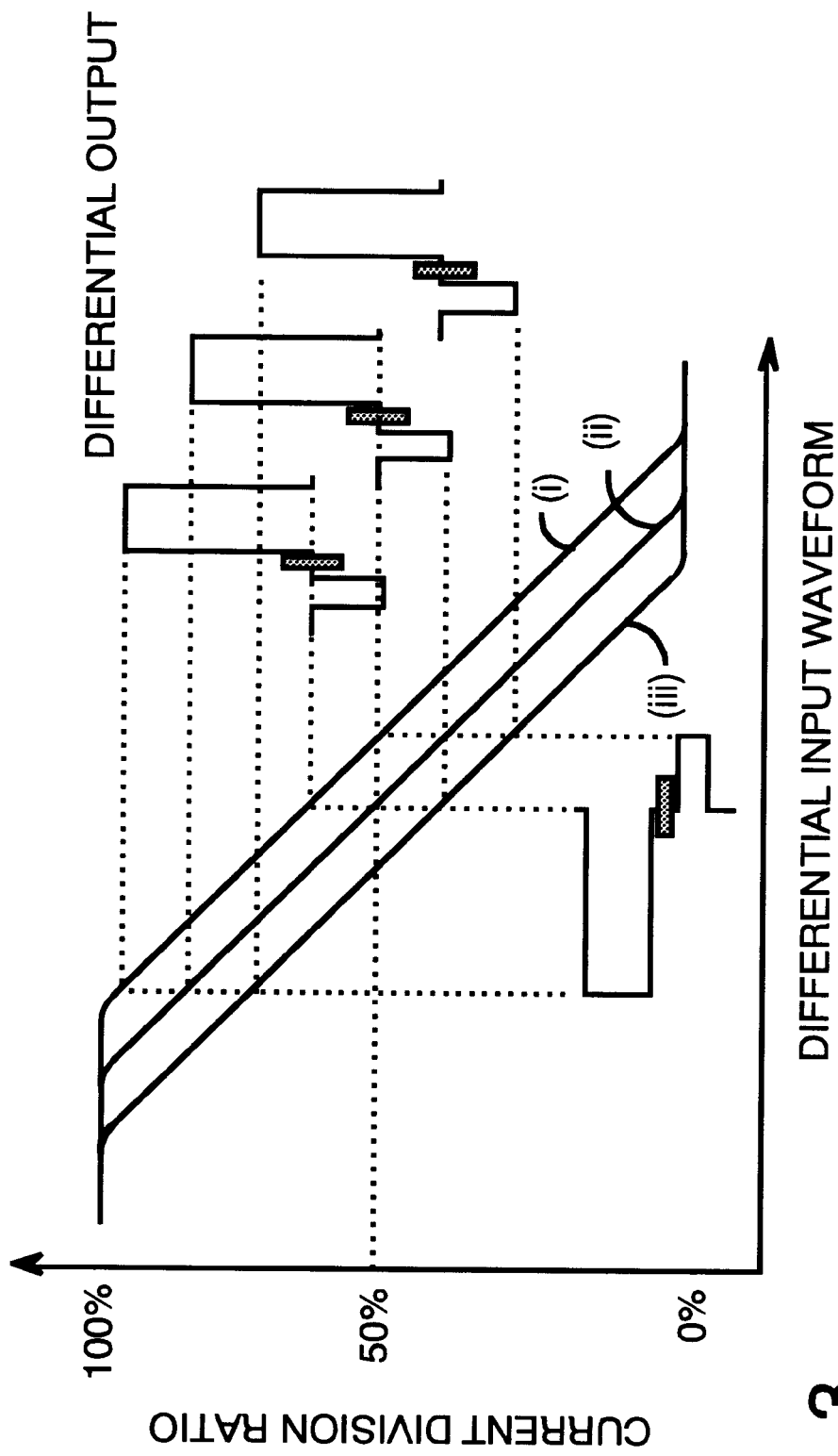
FIG. 3 shows an input-output relationship of direct current voltage of a direct current electrical potential correcting circuit in the present invention.

FIG. 3 shows a transfer curve of the differential amplification circuit. The horizontal scale of FIG. 3 shows a differential input waveform, or a voltage difference between each base electrode of the transistor Tr1 and the transistor Tr2. Since the base electrical potential of the transistor Tr2 is actually a direct current voltage, as shown in FIG. 3, only biased or differential electrical potential of the composite video signal inputted into the base electrode of the transistor Tr1 is changed. The vertical scale of FIG. 3 shows current division ratio, or the high/low of the bias electrical potential of a composite video signal waveform outputted from the emitter follower 3.

In FIG. 3, when the direct current electrical potential of the composite video signal (inputted to the base electrode of the transistor Tr1) and the direct current electrical potential of the point of the sample hold electrical potential (inputted to the base electrode of the transistor Tr2) are changed, transfer curves of the differential amplification circuit move like (i), (ii) and (iii). In transfer curve (ii), the state of a direct current electrical potential of the composite video signal (a sync tip direct current electrical potential and a pedestal direct current electrical potential) is approximately equivalent to the state of the direct current electrical potential electrical potential of the point of the sample hold electrical potential (the direct current electrical potential on the basis of the outputs of the first and second processing circuits 200, 300). That is, it becomes 50% if expressed by the current division ratio. As known from FIG. 3, by changing the direct current electrical potential into the base electrode of the transistor Tr2, the DC voltage level of the composite video signal outputted from the output terminal can be changed.

In consideration of the matter described above, the operation, in which a composite video signal is inputted into the input terminal, clamped in the clamp circuit, and outputted from the output terminal as the composite video signal, is explained below.

First, the operation is explained when the clamp pulse is not inputted into the clamp pulse input terminal. At the time, the second processing circuit 300 is in a non-active state and it does not have any influence on the point of the sample hold electrical potential. In other words, the output node of the second processing circuit 300 is in an electrically floating state, therefore, the present clamp circuit conducts sync tip clamp processing.

Accordingly, the electrical potential based on the differential voltage between the direct current electrical potential of the composite video signal inputted into the base electrode of the transistor Tr1 of the differential amplification circuit through the input node from the input terminal and the direct current electrical potential at the point of the sample hold electrical potential inputted into the base electrode of the transistor Tr2 of the differential amplification circuit is outputted from the output buffer circuit constructed by an emitter follower 3 and current resistor R3 to the output node of the direct current electrical potential correcting circuit 100. The direct current electrical potential outputted from the output node of the direct current electrical potential correcting circuit 100, that is, the direct current electrical potential of the composite video signal outputted from the output terminal is inputted into the first input node of the first processing circuit 200.

The first processing circuit 200 operates as follows. The direct current electrical potential outputted from the output node of the direct current electrical potential correcting circuit 100 is inputted to the base electrode of the transistor Tr3 of the comparator through the first input node. The first reference electrical potential Vsync from the first reference voltage source 10 is inputted to the base electrode of the transistor Tr4 of the comparator through the second input node. Accordingly, the comparator compares the direct current electrical potential of the composite video signal outputted from the output terminal with the first reference electrical potential Vsync from the first reference voltage source 10 and outputs the result obtained by comparison through the output node to the point of the sample hold electrical potential.

If the base electrical potential of the transistor Tr3 (the direct current electrical potential of the composite video signal outputted from the output terminal) ≧ the base electrical potential of the transistor Tr4 (the first reference electrical potential Vsync from the first reference voltage source 10), the collector current of the transistor Tr3 is smaller than the collector current of the transistor Tr4, then the current doesn't flow to the base electrode of the transistor of the saturation electric switch 9, therefore, the transistor of the saturation switch 9 becomes non-conductive. Therefore, the sample hold capacitor 15 is gradually charged by the constant current source 7 to cause the electrical potential of the point of the sample hold electrical potential to rise.

When the electrical potential of the point of the sample hold electrical potential rises, the base electrical potential of transistor Tr2 rises. Therefore, the conductive degree of the transistor Tr2 increases, and the conductive degree of the emitter follower transistor 3 falls, so that the direct current electrical potential of the output node of the direct current electrical potential correcting circuit 100, that is, the direct current electrical potential of the output composite video signal falls down gradually. When the operation is continued, the electrical potential of the leading edge of the sink of the composite video signal inputted into the base electrode of the transistor Tr3 (a sink direct current electrical potential) falls down lower than that of the base electrical potential of the transistor Tr4.

Accordingly, at the moment, since the collector current of the transistor Tr3 becomes larger than the collector current of the transistor Tr4, the electric current flows to the base of the transistor of the saturation electric switch 9, thereby the transistor of the saturation switch 9 becomes conductive and the sample hold capacitor 15 is discharged rapidly to cause the electrical potential of the point of the sample hold electrical potential to fall down again. As a result, the base electrical potential of the transistor Tr2 falls down again and the direct current electrical potential of the output node of the direct current electrical potential correcting circuit 100 rises again. As a result of repeating the operation described above, the direct current electrical potential of output node of direct current electrical potential correcting circuit 100, that is, the sync tip direct current electrical potential of the composite video signal outputted from the output terminal becomes the same electrical potential as the first reference electrical potential Vsync from the first reference voltage source 10.

Here, the condition in which the sync tip direct current electrical potential of the composite video signal is clamped is explained. In the period except the sink of the composite video signal, the base electrical potential of the transistor Tr3 of the first processing circuit 200 is constantly higher than the base electrical potential of the transistor Tr4. Accordingly, in the period except the sink of the composite video signal, the sample hold capacitor 15 continues to be charged by the constant current source 7.

The charged amount must be discharged in a moment of the sync tip of the composite video signal. Now, on the assumption that a constant current value of a constant current source $7=10\,\mu A$, a charging time in the period except the sink of the composite video signal=63.5 $\mu$sec, and a discharging time in the sync tip of the composite video signal=5 $\mu$sec, a minimum discharge current value of a transistor of the saturation switch 9 is 127 $\mu A$ [=(63.5 $\mu$sec/5 $\mu$sec)×10 $\mu A$].

Therefore, when setting the constant current value of the constant current source 7 to 10 $\mu A$, and he discharge current value of a transistor of the saturation electric switch 9 to more than 127 $\mu A$, the sync tip direct current electrical potential of the composite video signal outputted from the output terminal becomes the same electrical potential as the first reference electrical potential Vsync from the first reference source 10. Further, since the sample hold capacitor 15 can be charged and discharged by a small current as such, it is possible to make the capacity of the sample capacitor 15 small and the sample hold capacitor 15 can be incorporated in semiconductor integrated circuit together with the clamping circuit without attaching the outside of the semiconductor integrated circuit.

Next, the condition when a clamp pulse is inputted into the clamp pulse input terminal is explained. At this time, the second processing circuit 300 becomes active, since the switch 16 becomes conductive by a clamp pulse. Accordingly, the clamp circuit carries out pedestal clamp processing.

Accordingly, the electrical potential based on the differential voltage between the direct current electrical potential of the composite video signal inputted into the base electrode of the transistor Tr1 of the differential amplification circuit through the input node from the input terminal and the direct current electrical potential at the point of the sample hold electrical potential inputted into the base electrode of the transistor Tr2 of the differential amplification circuit is outputted from the output buffer circuit constructed by an emitter follower 3 and the resistor R3 to the output node of the direct current electrical potential correcting circuit 100. The direct current electrical potential outputted from the output node of the direct current electrical potential correcting circuit 100, that is, the direct current electrical potential of the composite video signal outputted from the output terminal is inputted into the first input node of the second processing circuit 300.

The second processing circuit 300 operates as follows. The direct current electrical potential outputted from the output node of the direct current electrical potential correcting circuit 100 is inputted to the base electrode of the transistor Tr5 of the comparator through the first input node. The second reference electrical potential Vped from the second reference voltage source 14 is inputted to the base electrode of the transistor Tr6 of the comparator through the second input node. Accordingly, the comparator compares the direct current electrical potential of the composite video signal outputted from the output terminal with the second reference electrical potential Vped from the second reference voltage source 14 and outputs the result obtained by comparison through the output node to the point of the sample hold electrical potential.

If the base electrical potential of the transistor Tr5 (the direct current electrical potential of the composite video signal outputted from the output terminal) ≧ the base electrical potential of the transistor Tr6 (the second reference electrical potential Vped from the second reference voltage source 14), the collector current of the transistor Tr11 (which is equivalent to the collector currents of transistors Tr9 and Tr5) is larger than the collector current of the transistor Tr13 (which is equivalent to the collector current of transistors Tr14, Tr12, Tr10 and Tr6), thereby the sample hold capacitor 15 is charged by the transistor Tr11. Therefore, the electrical potential of the point of the sample hold electrical potential increases.

When the electrical potential of the point of the sample hold electrical potential rises, the base electrical potential of the transistor Tr2 rises. Therefore, the conductive degree of the transistor Tr2 increases, and the conductive degree of the emitter follower transistor 3 falls, so that the direct current electrical potential of the output node of the direct current electrical potential correcting circuit 100, that is, the direct current electrical potential of the composite video signal to be outputted falls down.

When the pedestal direct current electrical potential of the composite video signal inputted into the base electrode of the transistor Tr5 is lower than the base electrical potential of the transistor Tr6, since the collector current of the transistor Tr11 (which is equivalent to the collector currents of the transistor Tr9 and Tr5) is smaller than the collector current of the transistor Tr13 (which is equivalent to the collector currents of transistors Tr14, Tr12, Tr10 and Tr6), the sample hold capacitor 15 is discharged by the transistor Tr13, which reduces the electrical potential of the point of the sample hold electrical potential.

When the electrical potential of the point of the sample hold electrical potential falls, the base electrical potential of transistor Tr2 falls and the direct current electrical potential of the output node of the direct current electrical potential correcting circuit 100, that is, the direct current electrical potential of the output composite video signal rises. Accordingly, the direct current electrical potential of the output node of the direct current electrical potential correcting circuit 100, that is, the pedestal direct current electrical potential of the composite video signal outputted from the output terminal becomes the same electrical potential as that of the second reference electrical potential Vped from the second reference voltage source 14.

As described above, when a clamp pulse is inputted into the clamp pulse input terminal, the clamp circuit conducts pedestal clamp processing precedingly, and when a clamp pulse is not inputted into the clamp pulse input terminal, the clamp circuit conducts the sync tip clamp processing.

Hence, in order to precedingly conduct the pedestal clamp processing when a clamp pulse is inputted into the clamp pulse input terminal, the following process is carried out. Now assuming that the composite video signal inputted into the input terminal is 2 Vp-p, the electrical potential difference between the sync tip direct current electrical potential and the pedestal direct current electrical potential, that is, the sink length of the composite video signal is approximately 570 mV (the normal sink length to be processed by the clamp circuit). Accordingly, relationship of the first and second reference electrical potentials Vped and Vsync is set as Vped−V sync≧570 mV+α. Where, α is a margin for the comparator of the first processing circuit 200 not to operate at the moment when the clamp circuit conducts the pedestal clamp processing, for example, it is 52 mV. The value of [570 mV+α] becomes a maximum sink length which is processed by the clamp circuit.

Accordingly, when the pedestal direct current electrical potential of the composite video signal outputted from the output terminal in the second processing circuit 300 is clamped to the second reference electrical potential Vped of the second reference voltage source 14, the base electrical potential of the transistor Tr3 constituting the comparator of the first processing circuit 200 is always higher than the base electric potential of the transistor Tr4. Therefore, the saturation switch 9 becomes non-conductive and then current flows through into the point of the sample hold electrical potential from the constant current source 7.

Therefore, if the minimum discharge current value I in the pulse period of a clamp pulse in the second processing circuit 300 is set to 342.5 μA, the pedestal clamp processing can be precedingly conducted, as understood from the following formula. Where, the discharge current in the pulse period of the clamp pulse in the second processing circuit 300 corresponds to the current difference between the collector current of the transistor Tr13 and the collector current of the transistor Tr11.

$$I=(68.5\mu sec/2\mu sec)\times 10\mu A=342.5\mu A$$

Where, one horizontal period of the composite video signal is 68.5 μsec, the width of a clamp pulse is 2 μsec, and the constant current value of the constant current source 7 is 10 μA. Accordingly, if the difference of the second reference electrical potential Vped of the second reference voltage source 14 and the first reference voltage Vsync of the first reference voltage source 10 is over the standard sink length of the composite video signal, and if the relationship between the charging current by the constant current source 7 of the first processing circuit 200 and the discharging current by the second processing circuit 300 satisfies the above formula, for example if the discharge current by the second processing circuit 300 is set to more than 342.5 μA, pedestal clamp processing can be precedingly conducted, and the pedestal direct current electrical potential of the composite video signal outputted from the output terminal becomes the same electrical potential as that of the second reference electrical potential Vped of the second reference voltage source 14. Further, in this case, since the charge and discharge current to the sample hold capacitor 15 is small, it is possible to incorporate the sample hold capacitor 15 into the semiconductor integrated circuit without attaching it outside of the semiconductor integrated circuit.

Embodiment 2

Figure 4:
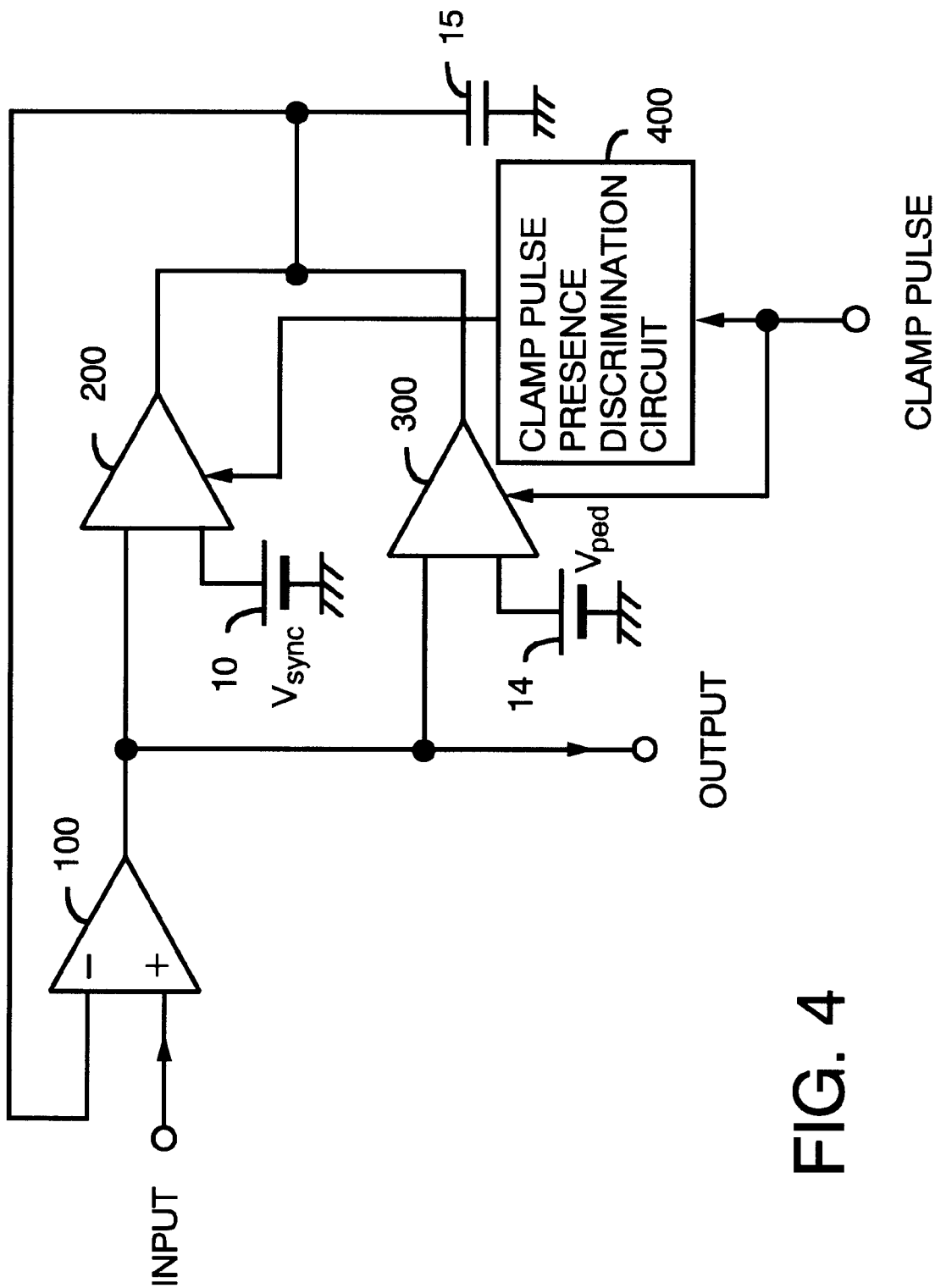
FIG. 4 shows an example of a clamp circuit of a second embodiment of the present invention.

FIG. 4 shows a clamp circuit of a second embodiment of the invention. In the second embodiment, the device of the first embodiment shown in FIG. 1 is provided with a clamp pulse presence discrimination circuit 400, thereby the active/non-active state of the first processing circuit 200 is controlled. That is, the clamp pulse presence discrimination circuit causes the first processing circuit 200 to be in a non-active state when a clamp pulse is inputted, and causes the first processing circuit 200 to be in an active state when the clamp pulse isn't inputted. When the first processing circuit 200 is in the non-active state, since the output node of the first processing circuit 200 is electrically in the floating state, the first processing circuit 200 doesn't have any influence on the point of the sample hold electrical potential. The operation in the active state of the first processing circuit 200 is the same as that of the first embodiment of the present invention.

Next, the operation of the clamp circuit of the second embodiment is explained below. When a clamp pulse presence discrimination means 400 judges that the clamp pulse is not inputted from the clamp pulse input terminal, the clamp pulse presence discrimination means 400 outputs the control signal which causes the first processing circuit 200 to be in an active state. Accordingly, the first processing circuit 200 becomes active, and the first processing circuit 200 conducts the same operation as that of the first embodiment shown in FIG. 1. On the other hand, when the clamp pulse is not inputted into the clamp pulse input terminal, since the second processing circuit 300 is in the non-active state, it doesn't have any influence on the point of the sample hold electrical potential. Therefore, only the first processing circuit 200 operates to charge or discharge the sample hold capacitor 15, so that the sync tip DC electrical potential of the composite video signal which is the output signal of the direct current electric potential correcting circuit 100 coincides with the first reference electrical potential Vsync of the first reference voltage source 10. According to the above operation, the predetermined electrical potential appears to the point of the sample hold electrical potential. According to the electrical potential which appeared at the point of the sample hold electric potential, the direct current electrical potential correcting circuit 100 clamps the sync tip DC electrical potential of the input composite video signal to output the clamped electrical potential to the output terminal. As a result, the sync tip DC electrical potential of the composite video signal in the output terminal comes to coincide with the first reference electrical potential Vsync, so the composite video signal based on the first reference electrical potential Vsync is outputted from the output terminal.

When the clamp pulse presence discrimination means 400 judges that a clamp pulse is inputted from the clamp pulse input terminal, the clamp pulse presence discrimination means 400 outputs a control signal which causes the first processing circuit 200 to non-active state. Accordingly, the first processing circuit 200 becomes non-active and the output node of the first processing circuit 200 is in the floating state. Therefore, the first processing circuit 200 doesn't have any influence on the point of the sample hold electrical potential.

Therefore, the clamp circuit is substantially the same clamp circuit as that constructed by the direct current electrical potential correcting circuit 100 and the second processing circuit 300, which carries out the same pedestal clamp processing as that of the first embodiment shown in FIG. 1. That is, when the clamp pulse is inputted into the clamp pulse input terminal, the second processing circuit 300 charges or discharges the sample hold capacitor 15 so that the pedestal DC electrical potential of a composite video signal which is the output signal of the direct current electric potential correcting circuit 100 coincides with the second reference electrical potential Vped of the second reference voltage source 14, and outputs the predetermined electrical potential to the point of sample hold electrical potential. Based on the electrical potential which appears at the point of the sample hold electrical potential, the direct current electrical potential correcting circuit 100 clamps the pedestal DC electrical potential of the input composite video signal and outputs the clamped electrical potential to the output terminal. As a result, the pedestal DC electrical potential of the composite video signal at the output terminal comes to coincide with the second reference electrical potential Vped and the composite video signal based on the second reference electrical potential Vped is outputted from the output terminal.

Figure 5:
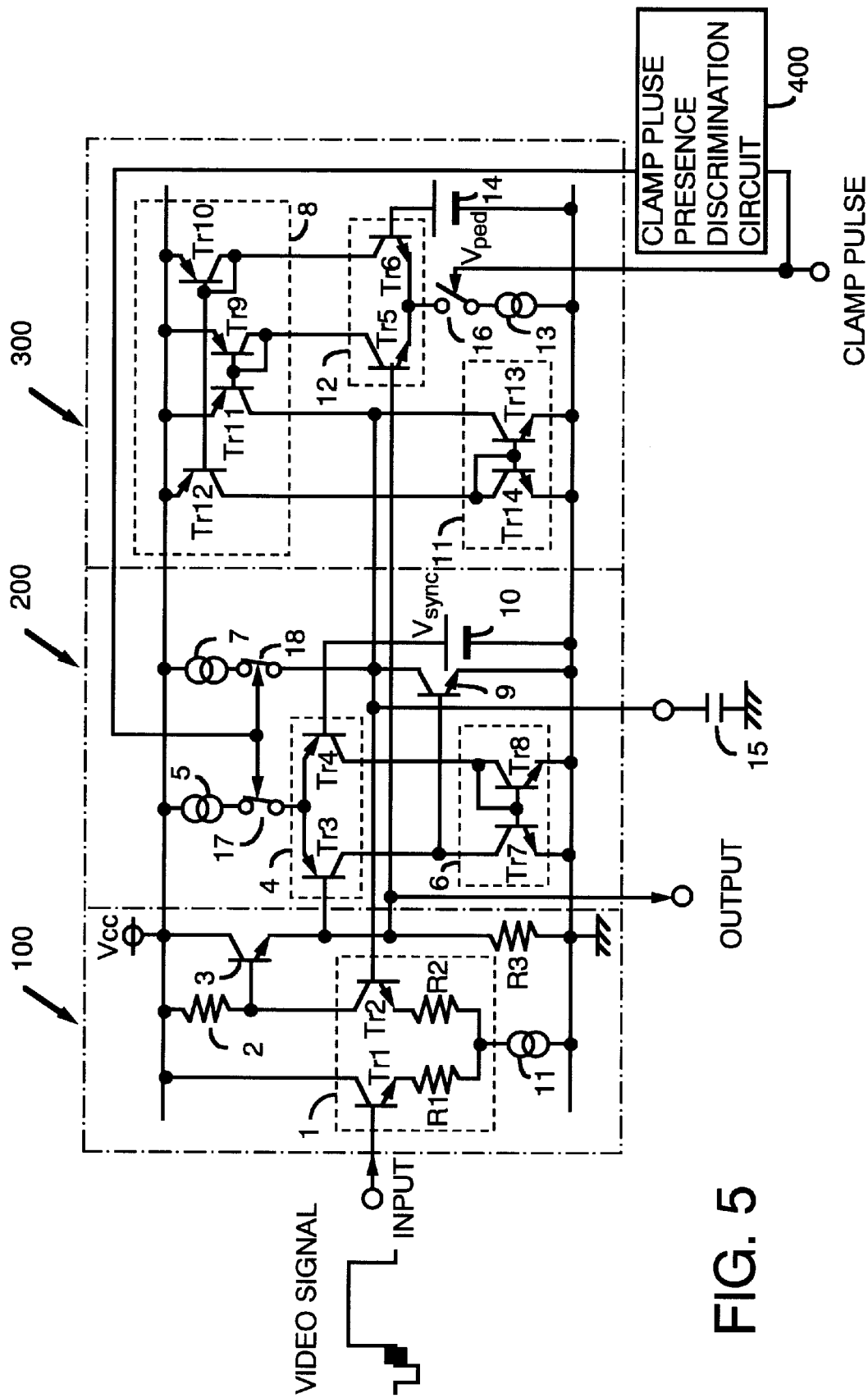
FIG. 5 shows an example of the circuit of FIG. 2.
Figure 6:
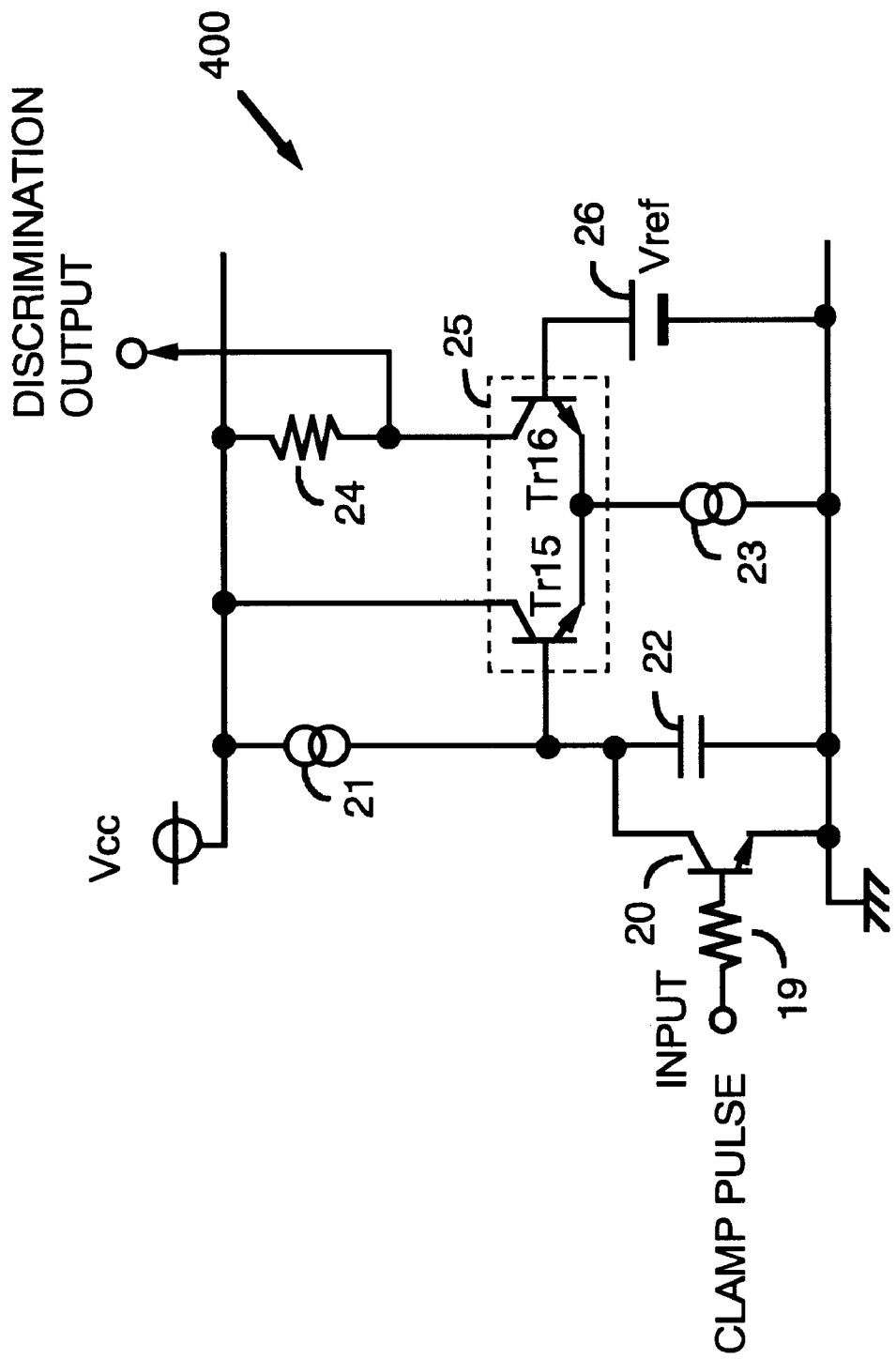
FIG. 6 shows a clamp pulse presence discrimination circuit of the second embodiment of the present invention.

Next, the concrete examples of the direct current electrical potential correcting circuit 100, the first and second processing circuits 200 and 300, and the clamp pulse presence discrimination circuit 400 shown in FIG. 4 are explained using FIG. 5 and FIG. 6. First, FIG. 5 is a detailed circuit construction corresponding to FIG. 2 in the first embodiment described above. FIG. 5 is equal to the first embodiment shown in FIG. 2, except the clamp pulse presence discrimination circuit 400 is newly provided and the first processing circuit 200 is selected to the active/non-active state based on a control signal from the clamp pulse presence discrimination circuit 400. The elements in FIG. 5 having the same reference numbers as those in FIG. 2 are the same portions or the corresponding portions. Accordingly the detailed explanation of the same portions is omitted.

The first processing circuit 200 of the second embodiment is provided with switches 17 and 18 in addition to the first processing circuit 200 of the first embodiment shown in FIG. 2. One end of the switch 17 is connected in series to one end of a constant current source 5 whose other end is connected to the voltage source Vcc, and the other end of the switch 17 is connected to the common emitter of the pair transistors Tr3, Tr4. The switch 17 is comprised of, for example, NPN transistor. One end of the switch 18 is connected in series to one end of a constant current source 7 whose other end is connected to the voltage source Vcc, and the other end of the switch 18 is connected to the output node of the first processing circuit 200. The switch 18 is also comprised of, for example, NPN transistor.

These switches 17 and 18 become conductive state when the control signal received from the clamp pulse presence discrimination circuit 400 is the active state, in other words, the clamp pulse is not inputted to the clamp pulse input terminal, and becomes non-conductive state when the control signal received from the clamp pulse presence discrimination circuit 400 is in the non-active, in other words, the clamp pulse is inputted to the clamp pulse input terminal. When the switch 17 becomes non-conductive, the comparator of the first processing circuit 200 doesn't operate at all, and when the switch 18 becomes the on-conductive state, the output buffer circuit of the first processing circuit 200 doesn't operate at all. Therefore, the output node of the first processing circuit 200 becomes electrically floating state.

The detailed clamp pulse presence discrimination circuit 400 is shown in FIG. 6. In FIG. 6, the clamp pulse input terminal is connected to the input node and output terminal is connected to the switches 17, 18 of the first processing circuit 200 to send the control signal in response to the presence or absence of the clamp pulse.

In FIG. 6, the clamp pulse presence discrimination circuit 400 comprises a resistor limiting current 19 whose one end is connected to the input node connected to the clamp pulse input terminal, an NPN transistor 20 whose base electrode is connected to the other end of the resistor 19 for limiting current and whose emitter electrode is connected to the ground electrical potential node, a constant current source 21 which is connected between the collector electrode of the NPN transistor 20 and the voltage source Vcc, and a capacitor 22 which is connected between the collector electrode of the NPN transistor 20 and the ground electrical potential node. The limiting current resistor 19, the NPN transistor 20, the constant current source 21 and the capacitor 22 constitute a clock pulse detecting circuit.

A differential pair transistor 25 is constructed by a pair of NPN transistors Tr15 and Tr16. The base electrode of NPN transistor Tr15 is connected to the output node of the clock pulse detecting circuit, that is, to one electrode of the capacitor 22. The collector electrode of the NPN transistor Tr15 is connected to the voltage source Vcc. The emitter electrodes of the NPN transistor Tr15 and the NPN transistor Tr16 are connected to the ground electrical potential node via the constant current source 23. The collector electrode of the NPN transistor Tr16 is connected to the voltage source Vcc via the load resistance 24 and also connected to the output node of the clock pulse presence discrimination circuit 400. The base electrode of the NPN transistor Tr16 receives reference voltage Vref from the third reference voltage source 26. The differential pair transistor 25, the constant current source 23 and the load resistance 24 constitute a comparator.

Next, the operation of the clamp pulse presence discrimination circuit 400 constructed as described above is explained below. Since the circuit construction of the second embodiment shown in FIG. 5 greatly differs from that of the first embodiment in that the clock pulse presence discrimination circuit 400 is included, only the difference is mainly explained. First the operation of the clamp presence discrimination circuit 400 is explained in case that the clamp pulse is inputted from the clamp pulse input terminal.

Figure 7:
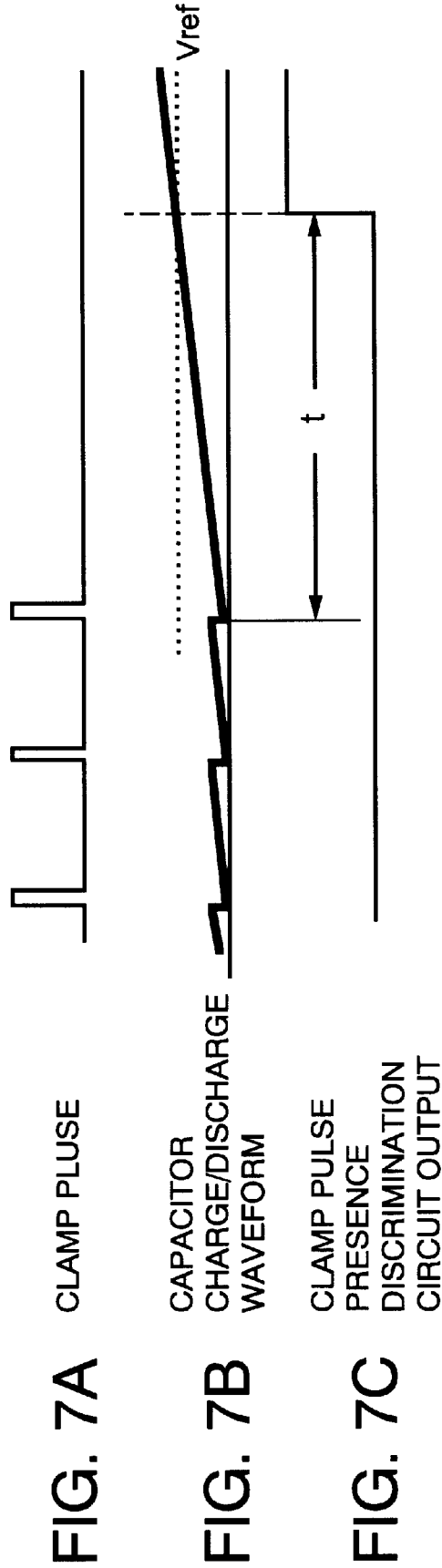
FIGS. 7A–7C explain operation of the clamp pulse presence discrimination circuit of the second embodiment of the present invention.

The NPN transistor 20 becomes conductive state when a clamp pulse is inputted as shown in FIG. 7A, and then the electric charge stored in the capacitor 22 is discharged through the NPN transistor 20 as shown in FIG. 7B. Since the NPN transistor 20 is non-conductive until the next clamp pulse comes, the capacitor 22 is charged through the constant current source 21 and then the electrical potential of the output node of the clamp pulse detecting circuit gradually rises as shown in FIG. 7B. The NPN transistor 20 becomes conductive state again when the next clamp pulse comes and the charge stored in the capacitor 22 is discharged through the NPN transistor 20 instantly and then the electrical potential of the output node of the clamp pulse detecting circuit becomes the ground electrical potential as shown in FIG. 7B.

Therefore, so long as the clamp pulse is inputted, the electrical potential of the output node of the clamp pulse detecting circuit doesn't rise more than the predetermined electrical potential. Since the predetermined electrical potential is set below the reference voltage Vref from the third reference voltage source 26, the base electrical potential of the transistor Tr15 constituting a comparator is lower than the base electrical potential of the transistor Tr16 constituting a comparator, then the transistor Tr16 becomes conductive state and the output node of the clamp presence discrimination circuit 400 is in low level as shown in FIG. 7C.

On the other hand, since the NPN transistor 20 is always in a non-conductive state when a clamp pulse isn't inputted from the clamp pulse input terminal, the capacitor 22 continues being charged through the constant current source 21, then the electrical potential of the output node of the clamp pulse detecting circuit gradually rises as shown in FIG. 7B. When the electrical potential of the output node of the clamp pulse detecting circuit becomes higher than the reference voltage Vref from the third reference voltage source 26, the base electrical potential of transistor Tr15 constituting a comparator becomes higher than the base electrical potential of the transistor Tr16 constituting a comparator, and the transistor Tr16 becomes non-conductive state. Therefore, the output node of the clamp presence discrimination circuit 400 becomes high level as shown in FIG. 7C.

Now, assuming that the constant current value of the constant current source 21 is 0.5 $\mu$A, capacitance value of the capacitor 22 is 50 pF, the reference voltage Vref from the third reference voltage source 26 is 3.0 V and the time t until the clamp presence discrimination circuit 400 judges that a clamp pulse is not inputted, in other words, the time t from the point where the absence of the clamp pulse is detected to the point where the electrical potential of the output node of the clamp presence discrimination circuit 400 changes to high level, is obtained as follows:

$$T = (C \times V)/i = (50\text{pF} \times 3.0) / 0.5\mu A = 300\mu\text{sec}.$$

Accordingly, in the clamp pulse presence discrimination circuit 400, it is judged that the clamp pulse is absent, if the succeeding clamp pulse does not inputted for about 300 $\mu$sec, after starting detection of the absence of the clamp pulse, for example, after power is turned on or after the preceding clamp pulse was inputted.

As described above, when the clamp pulse presence discrimination circuit 400 judges that there is not an input of a clamp pulse, a control signal of high level is outputted from the clamp pulse presence discrimination circuit 400 to the switches 17 and 18 of the first processing circuit 200. The switches 17 and 18 which received the control signal of high level become conductive, which becomes the same circuit configuration as that of the first embodiment shown in FIG. 2. In this state, the first processing circuit 200 conducts the sync tip clamp processing as well as that described in the first embodiment.

On the other hand, when a clamp pulse presence discrimination circuit 400 judges that the clamp pulse is inputted, the control signal of low level is outputted from the clamp pulse presence discrimination circuit 400 to the switches 17 and 18 of the first processing circuit 200. The switches 17 and 18 which received the control signal of low level becomes the non-conductive state, then the first processing circuit 200 becomes the non-active state. The output node of the first processing circuit 200 becomes electrically floating when the first processing circuit 200 becomes non-active, therefore, the first processing circuit 200 doesn't give any influence on the point of the sample hold electrical potential.

As a result, the clamp processing of the clamp circuit is substantially conducted by the direct current electric potential correcting circuit 100 and the second processing circuit 300. Since the clamp processing by the direct current electric potential correcting circuit 100 and the second processing circuit 300 becomes equal to that by the direct current electric potential correcting circuit 100 and the second processing circuit 300 in the first embodiment shown in FIG. 2 when the clamp pulse is inputted. Therefore, the clamp circuit of the second embodiment conducts the pedestal clamp processing as well as that of explained in the first embodiment.

Therefore, even through the clamp circuit constructed as described above, it not only has the same effects as that of the first embodiment but also has such effects described below. That is, the first processing circuit 200 is controlled to be in the non-active state by the clamp pulse presence discrimination circuit 400 when the clamp pulse is inputted, and therefore, the first processing circuit 200 does not have any influence on the point of the sample hold electrical potential. Therefore, the difference of the first and the second reference electrical potentials Vped, Vsync from the first and the second reference power supplies 10, 14 can be approximately 570 mV (normal sink length of the composite video signal to be processed in the clamp circuit). As a result, the potential difference, between the sync tip DC electrical potential of the composite video signal which is outputted from the output terminal after the sync tip clamp processing is conducted, and the pedestal DC electric potential of the composite video signal which is outputted from the output terminal after the pedestal clamp processing is conducted, can be reduced.

Embodiment 3

Figure 8:
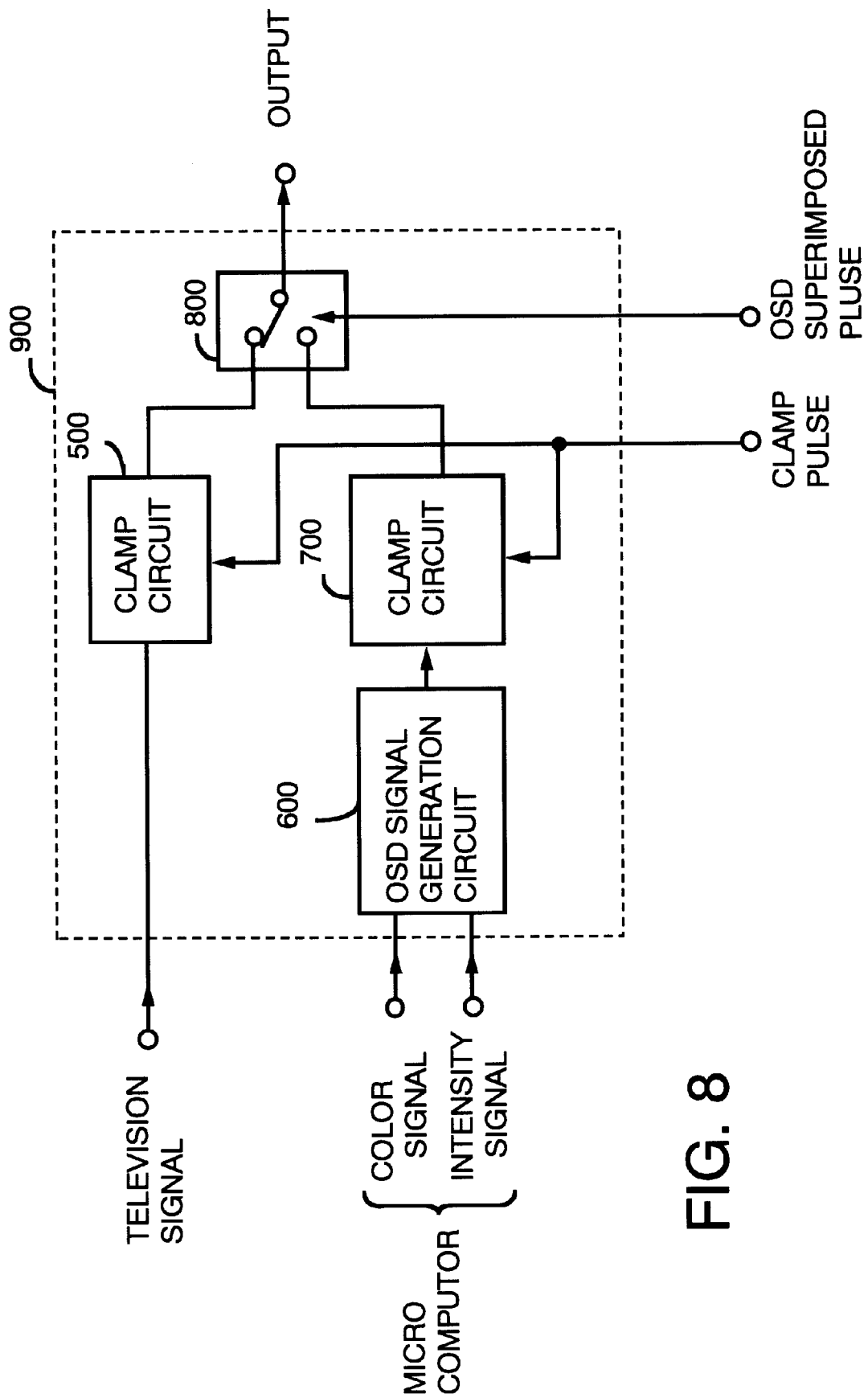
FIG. 8 shows a television signal superimposing circuit of the present invention.
Figure 9:
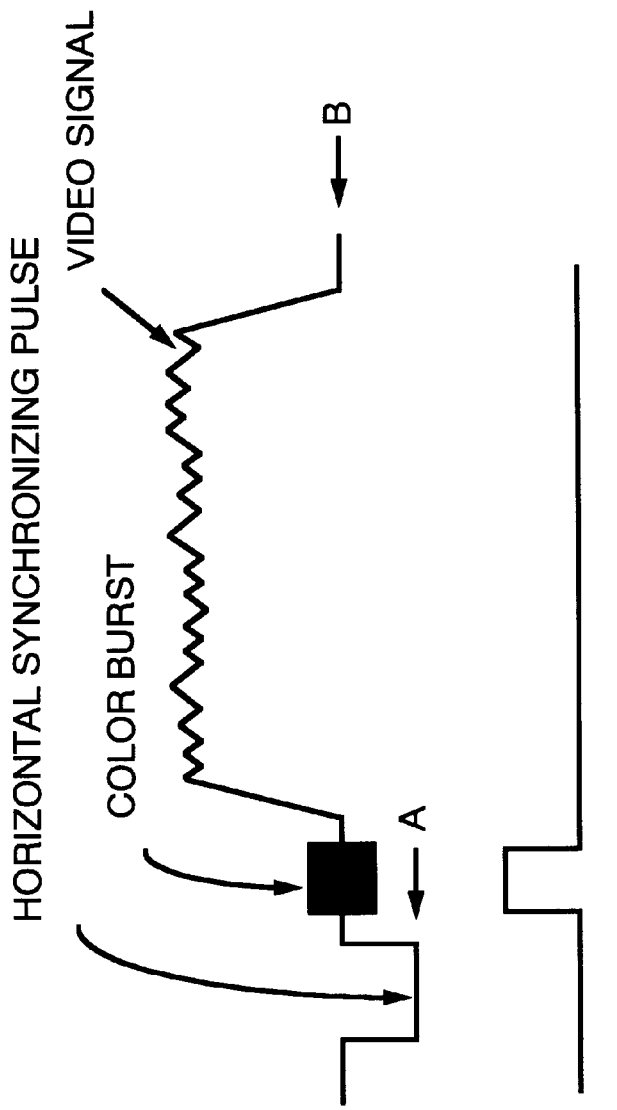
FIGS. 9A, 9B show timing charts of the video signal and the clamp pulse.
Figure 10:
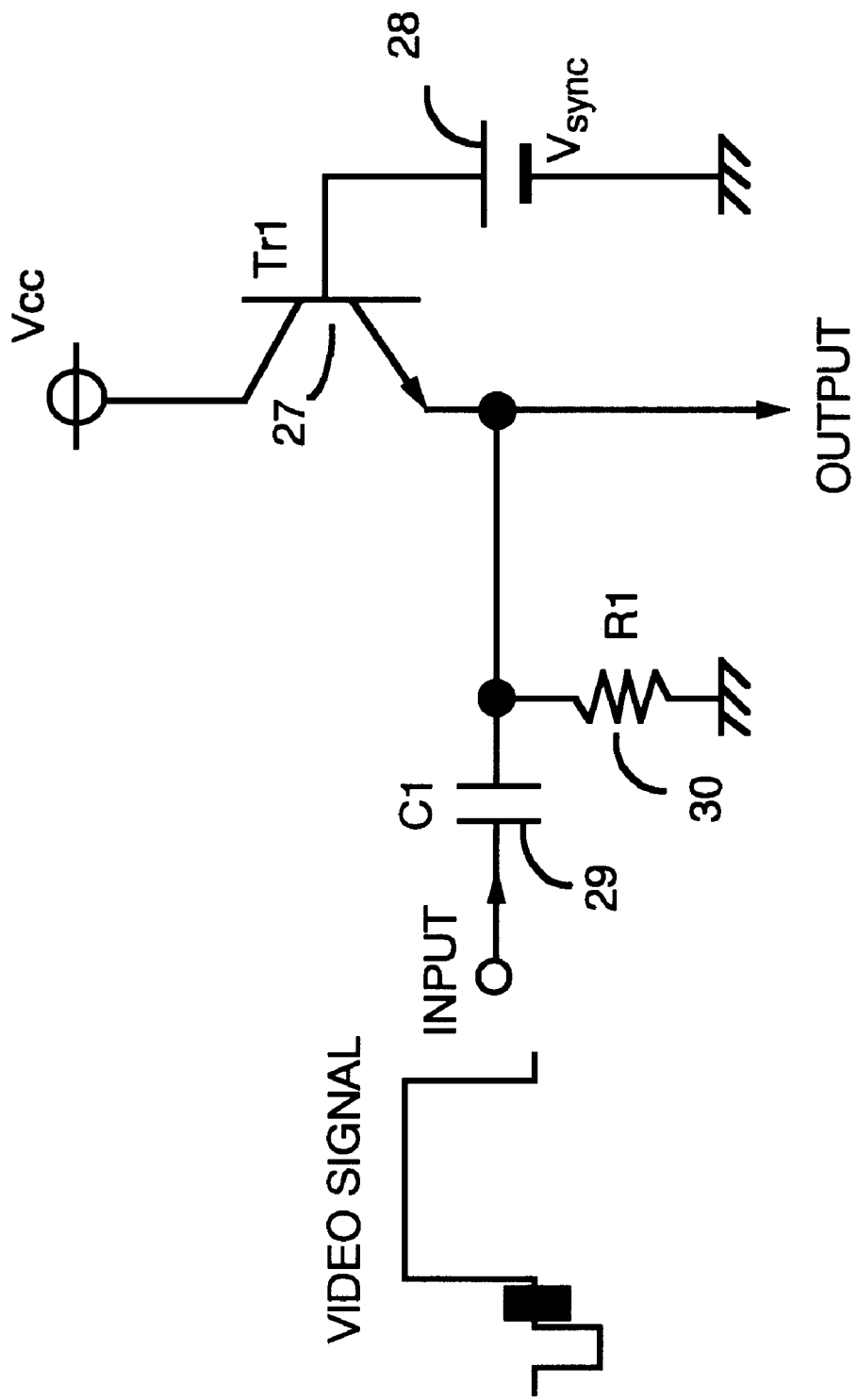
FIG. 10 shows a conventional sync tip clamp.
Figure 11:
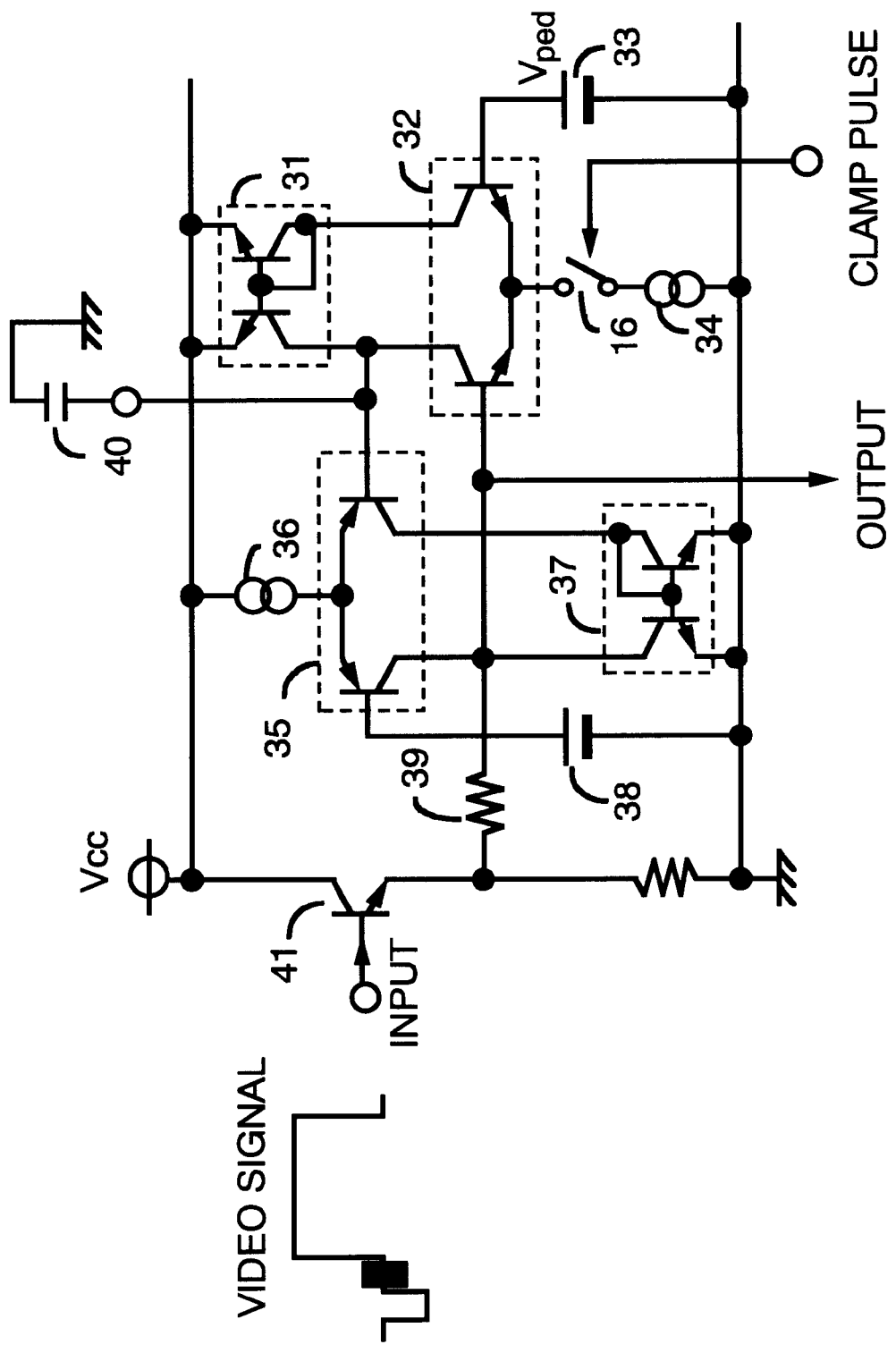
FIG. 11 shows a conventional pedestal clamp circuit.

FIG. 8 illustrates a television signal superimposing circuit of a third embodiment of the invention. In FIG. 8, a first clamp circuit 500 receives a main television composite video signal is, and the clamp pulse from the clamp pulse input terminal, which is constructed by the clamp circuit shown in the first embodiment or the second embodiment. An OSD (On Screen Display) signal generation circuit 600 generates a composite video signal in response to a color signal and intensity signal included in the sub-composite video signal (OSD signal) received from the control means such as a micro computer. A second clamp circuit 700 receives the sub-composite video signal from the OSD signal generation circuit 600 and the clamp pulse from the clamp pulse input terminal, which is constructed by the clamp circuit shown in the first embodiment or the second embodiment. Further, the clamp pulse is generated by synchronizing with a horizontal synchronizing pulse of the main composite video signal, for example, by means of the control means such as the micro computer.

A switching circuit 800 receives the main and the sub-composite video signals from the first and second clamp circuits 500, 700 and receives the switching signal (OSD superimposed pulse) as well. The switching circuit 800 outputs the main composite video signal from the first clamp circuit 500 when the switching signal is in the low level (in the period except the OSD superimposed pulse is received) or outputs the sub-composite video signal from the second clamping circuit 700 when the switching signal is in the high level (in the period when the OSD superimposed pulse is received). The numeral 900 denotes a television signal superimposing circuit.

Next, the operation of the television signal superimposing circuit 900 constructed as described above is explained. First, a case is explained when the OSD signal received from the control means such as the micro computer is superimposed on the television signal. The control means such as the micro computer outputs a color signal, an intensity signal included in the OSD signal, and a clamp pulse. A television signal inputted into the television signal superimposing circuit 900 is inputted into the clamp circuit 500. The clamp circuit 500 carries out the pedestal clamp processing as described in the first embodiment and the second embodiment in response to the clamp pulse. As a result, the pedestal DC electrical potential of the television signal is coincides with the second reference electrical potential Vped, and the television signal based on the second reference electrical potential Vped is outputted from the output terminal of the clamp circuit 500.

Further, the color signal and the intensity signal of the OSD signal received from the control means such as the micro computer are inputted into the television signal superimposing circuit 900, and converted into the OSD composite video signal by the OSD signal generation circuit 600, and the converted signal is outputted to the clamp circuit 700. The clamp circuit 700 carries out the pedestal clamp processing on the OSD signal as described in the first embodiment and the second embodiment. As a result, the pedestal DC electrical potential of the OSD signal is coincides with the second reference electrical potential Vped, and the OSD signal based on the second reference electrical potential Vped is outputted from the output terminal of the clamp circuit 700.

The switching circuit 800 outputs a television signal from the first clamp circuit 500 when the switching signal is in the low level (in the period except the OSD superimposed pulse is received), or outputs the OSD signal from the second clamping circuit 700 when the switching signal is in the high level (when the OSD superimposed pulse is generated). That is, the switching circuit 800 outputs the television signal superimposed with the OSD signal when the OSD superimposed pulse is inputted. At the time, the levels of the television signal and the OSD signal are based on the second reference electrical potential Vped by the first and second clamp circuits 500, 700, respectively, therefore, the television signal and the OSD signal can be superimposed without any level difference.

On the other hand, when the OSD signal from the control means such as the micro computer isn't outputted, the OSD superimposed pulse isn't also outputted from the control means such as the micro computer. Therefore, the television signal superimposing circuit 900 always outputs the clamp-processed television signal from the first clamp circuit 500 via the switching circuit 800. In the television signal superimposing circuit 900, it may be requested the case when the clamp pulse is outputted or when the clamp pulse is not outputted. In the third embodiment, the first clamping circuit 500 is constructed by the clamp circuits described in the first embodiment and the second embodiment. Therefore, in the mode where the clamp pulse is outputted, the pedestal clamp processing described in the first and second embodiments is carried out, and then a television signal based on the second reference electrical potential Vped is obtained. On the other hand, in the mode where the clamp pulse is not outputted, the sync tip clamp processing described in the first and second embodiments is carried out, and then a television signal based on the first reference electrical potential Vsync is obtained. As a result, according to various modes of the present invention, the composite video signal having respective different direct electrical potential is obtained, therefore good picture quality can be obtained.

What is claimed is:

1. A clamp circuit for clamping a video signal comprising:
    a video signal input terminal for receiving a composite video signal including a horizontal synchronization signal, a pedestal signal, and a video signal;
    a clamp pulse input terminal for receiving a clamp pulse;
    an output terminal for outputting an adjusted video signal;

a direct current electrical potential correcting circuit, receiving the composite video signal from the video signal input terminal and a correcting control signal, for correcting a direct current electrical potential of the composite video signal in response to the correcting control signal, and for outputting the adjusted composite video signal from the output terminal;

a first processing circuit, receiving the adjusted composite video signal from the direct current electrical potential correcting circuit and a first reference electrical potential from a first reference voltage source, and outputting the correcting control signal to the direct current electrical potential correcting circuit, for carrying out sync tip clamp processing; and a second processing circuit, receiving the composite video signal from the direct current electrical potential correcting circuit, a second reference electrical potential from a second reference voltage source, and a clamp pulse from the clamp pulse input terminal, and outputting the correcting control signal to the direct current electrical potential correcting circuit, for carrying out pedestal clamp processing.

2. The clamp circuit according to claim 1, wherein the direct current electrical potential correcting circuit comprises a differential amplification circuit comprising a non-inverting input node connected to the video signal input terminal and an inverting input node connected to a point of a sample hold electrical potential and to a sample hold capacitor, the first processing circuit comprises:
a first input node connected to an output node of the direct current electrical potential correcting circuit;
a second input node receiving the first reference electrical potential from the first reference voltage source, and
an output node connected to the point of the sample hold electrical potential; and the second processing circuit comprises:
a first input node connected to the output node of the direct current electrical potential correcting circuit;
a second input node receiving the second reference electrical potential from the second reference voltage source, and
an output node connected to the point of the sample hold electrical potential, for controlling an activity state in response to the clamp pulse.

3. The clamp circuit according to claim 1, wherein the direct current electrical potential correcting circuit comprises:
a first differential transistor pair including a first transistor having a base electrode receiving a composite video signal, and a collector;
a second transistor having a base electrode receiving outputs of the first and second processing circuits, and a collector;
a first constant current source having one end connected to the collectors of the first and second transistors via respective resistors, and another end connected to a ground;
a load resistor corresponding to the second transistor; and
an emitter follower transistor outputting the composite video signal;

the first processing circuit comprises:
a second differential transistor pair comprising a third transistor having a base electrode connected to the emitter follower transistor, an emitter, and a collector, and a fourth transistor having a base electrode receiving the first reference electrical potential from the first reference voltage source, an emitter, and a collector;
a second constant current source having one end connected to the voltage source and another end connected to the emitters of the third and fourth transistors;
a third constant current source having one end connected to the voltage source and another end connected to the first processing circuit;
a first current mirror circuit including fifth and sixth transistors having collector electrodes connected to corresponding collectors of the third and fourth transistors, respectively; and
a seventh transistor connected to the first current mirror circuit for providing an output of the first processing circuit; and the second processing circuit comprises:
a third differential transistor pair including an eighth transistor having a base electrode connected to the emitter follower transistor, an emitter, and a collector, and a ninth transistor having a base electrode receiving the second reference electrical potential from the second reference voltage source, an emitter, and a collector;
a first switch having one end connected to the emitters of the eighth and ninth transistors, and another end connected to the ground via a fourth current source, for controlling an activity state of the second processing circuit in response to the clamp pulse;
a second current mirror circuit including tenth, eleventh, twelfth and thirteenth transistors in which a collector electrode of the tenth transistor is connected to the collector of the eighth transistor and the collector of the twelfth transistor is connected to the collector of the ninth transistor, and
a third current mirror circuit including fourteenth and fifteenth transistors, in which a collector electrode of the fourteenth transistor is connected to a collector electrode of the thirteenth transistor, a collector electrode of the fifteenth transistor is connected to a collector electrode of the eleventh transistor, for providing an output of the second processing circuit.

4. The clamp circuit according to claim 3, wherein $$Vped < Vsync - A$$

where
Vped is the first reference electrical potential,
Vsync is the second reference electrical potential, and
A is a standard sink length of composite video signals.

5. A clamp circuit for clamping a video signal comprising:

a direct current electrical potential correcting circuit for receiving a composite video signal from a video signal input terminal and a correcting control signal, correcting a direct current electrical potential of the composite video signal in response to the correcting control signal, and outputting an adjusted composite video signal from an output terminal;

a clamp pulse presence discrimination circuit for detecting presence or absence of a clamp pulse and outputting a clamp pulse presence or absence signal;

a first processing circuit receiving the adjusted composite video signal from the direct current electrical potential correcting circuit, a first reference electrical potential from a first reference voltage source, and the clamp pulse presence or absence signal from the clamp pulse presence discrimination circuit, for activating the first processing circuit when the clamp pulse presence or absence signal indicates an absence, for detecting the lowest electrical potential of the composite video signal outputted from the direct current electrical potential correcting circuit, for clamping the detected electrical potential to the first reference electrical potential, and for outputting the clamped electrical potential to the direct current electrical potential correcting circuit as the correcting control signal, for carrying out sync tip clamp processing; and a second processing circuit receiving the adjusted composite video signal from the direct current electrical potential correcting circuit, a second reference electrical potential from a second reference voltage source, and a clamp pulse from the clamp pulse input terminal, for detecting an electrical potential of the inputted composite video signal during a pulse period corresponding to the clamp pulse, for clamping the detected electrical potential to the second reference electrical potential, and for outputting the clamped electrical potential to the direct current electrical potential correcting circuit as the correcting control signal, for carrying out pedestal clamp processing.

6. The clamp circuit for video signal according to claim 5, wherein the direct current electrical potential correcting circuit comprises a differential amplification circuit comprising a non-inverting input node connected to the video signal input terminal and an inverting input node connected to a point of a sample hold electrical potential and to a sample hold capacitor;

the first processing circuit comprises:
a first input node connected to an output node of the direct current electrical potential correcting circuit;
a second input node receiving the first reference electrical potential from the first reference voltage source, and
an output node connected to the point of the sample hold electrical potential, for controlling an activity state in response to the clamp pulse presence or absence signal from the clamp pulse presence discrimination circuit; and the second processing circuit comprises:
a first input node connected to the output node of the direct current electrical potential correcting circuit;
a second input node receiving the second reference electrical potential from the second reference voltage source; and
an output node connected to the point of the sample hold electrical potential, for controlling an activity state in response to the clamp pulse.

7. The clamp circuit according to claim 5, wherein the direct current electrical potential correcting circuit comprises:

a first differential transistor pair including a first transistor having a base electrode receiving a composite video signal, and a collector;
a second transistor having a base electrode receiving outputs of the first and second processing circuits, and a collector;
a first constant current source having one end connected to the collectors of the first and second transistors via respective resistors, and another end connected to a ground;
a load resistor corresponding to the second transistor; and
an emitter follower transistor outputting the composite video signal;

the first processing circuit comprises:
a second differential transistor pair comprising a third transistor having a base electrode connected to the emitter follower transistor, an emitter, and a collector, and a fourth transistor having a base electrode receiving the first reference electrical potential from the first reference voltage source, an emitter, and a collector;
first and second constant current sources having first ends connected to a voltage source and second ends;
a first switch having a first end connected in series with the second end of the second constant current source and a second end connected to the emitters of the third and fourth transistors, for controlling conductivity state in response to the clamp pulse presence or absence signal from the clamp pulse presence discrimination circuit;
a second switch having a first end connected in series with a second end of a third constant current source and a second end connected to an output of the first processing circuit, for controlling conductivity state in response to the clamp pulse presence or absence signal from the clamp pulse presence discrimination circuit;
a first current mirror circuit including fifth and sixth transistors having collector electrodes connected to corresponding collectors of the third and fourth transistors, respectively; and
a seventh transistor connected to the first current mirror circuit for providing an output of the first processing circuit; and the second processing circuit comprises:
a third differential transistor pair including an eighth transistor having a base electrode connected to the emitter follower transistor, a collector, and an emitter, and a ninth transistor having a base electrode receiving the second reference electrical potential from the second reference voltage source, a collector, and an emitter;
a third switch having a first end connected to the emitters of the eight and ninth transistors and a second end connected to the ground via a fourth current source, for controlling an activity state of the second processing circuit in response to the clamp pulse;
a second current mirror circuit including tenth, eleventh, twelfth, and thirteenth transistors in which a collector electrode of the tenth transistor is connected to the collector of the eighth transistor and a collector electrode of the twelfth transistor is connected to the collector of the ninth transistor, and
a third current mirror circuit including fourteenth and fifteenth transistors in which a collector electrode of the fourteenth transistor is connected to a collector electrode of the thirteenth transistor, a collector electrode of the fifteenth transistor is connected to a collector electrode of the eleventh transistor, for providing an output of the second processing circuit.

8. The clamp circuit according to claim 7, wherein the clamp pulse presence discrimination circuit comprises:
a sixteenth transistor having a base electrode receiving the clamp pulse from the clamp pulse input terminal;

a capacitor having a first end connected to a collector electrode and a second end connected to an emitter electrode of the sixteenth transistor;

a fifth constant current source having one end connected to the voltage source and another end connected to the first end of the capacitor;

a differential transistor pair including a seventeenth transistor and an eighteenth transistor having emitters and collectors, a base electrode of the seventeenth transistor being connected to the first end of the capacitor, and a base electrode of the eighteenth transistor being connected to a reference electrical potential of the first reference voltage source;

a sixth constant current source connected to the emitters of the seventeenth and eighteenth transistors, and an output node connected to the collector of the eighteenth transistor.

9. The clamp circuit according to claim 8, wherein $$Vped = Vsync - A$$

where

Vped is the first reference electrical potential,

Vsync is the second reference electrical potential, and

A is a standard sink length of composite video signals.

10. A composite video signal superimposing circuit comprising:

a first clamp circuit which receives a main composite video signal, a first reference electrical potential and a second reference electrical potential, outputs the main composite video signal based on the first reference electrical potential when the clamp pulse is not received, and outputs the main composite video signal based on the second reference electrical potential when a clamp pulse is received;

a second clamp circuit which receives a sub-composite video signal and a second reference electrical potential, outputs the sub-composite video signal based on the second reference electrical potential when the clamp pulse is received; and a switching circuit which receives the main and the sub-composite video signal from the first and second clamp circuits, and selectively outputs the main composite video signal or the sub-composite video signal in response to a switching signal.

11. A composite video signal superimposing circuit according to claim 10, wherein said first clamp circuit and said second clamp circuit are constructed by the clamp circuit of claim 1.

12. A composite video signal superimposing circuit according to claim 10, wherein said first clamp circuit and said second clamp circuit are constructed by the clamp circuit of claim 5.

* * * * *